(12) United States Patent
Lee et al.

(10) Patent No.: US 10,430,701 B2
(45) Date of Patent: Oct. 1, 2019

(54) MAGNETIC SECURE TRANSMISSION DEVICE, ELECTRONIC DEVICE AND MOBILE SYSTEM INCLUDING THE SAME

(71) Applicant: Samsung Electronics Co., Ltd., Suwon-si, Gyeonggi-do (KR)

(72) Inventors: Sung-Woo Lee, Suwon-si (KR); Hyoung-Seok Oh, Seoul (KR); Sang-Hee Kang, Hwaseong-si (KR); Kwang-Chan Lee, Hwaeseong-si (KR); Dae-Woong Cho, Seoul (KR); Jung-Wook Heo, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 54 days.

(21) Appl. No.: 15/426,397

(22) Filed: Feb. 7, 2017

(65) Prior Publication Data

US 2018/0032850 A1 Feb. 1, 2018

(30) Foreign Application Priority Data

Aug. 1, 2016 (KR) ........................ 10-2016-0097850

(51) Int. Cl.
*G06K 19/06* (2006.01)
*G06K 7/08* (2006.01)

(52) U.S. Cl.
CPC ....... *G06K 19/06206* (2013.01); *G06K 7/084* (2013.01); *G06K 19/06196* (2013.01);
(Continued)

(58) Field of Classification Search
CPC ............. G06K 19/06206; G06K 7/084; G06K 19/06196
See application file for complete search history.

(56) References Cited

U.S. PATENT DOCUMENTS 8,188,854 B2 * 5/2012 Yamashita ............. H02J 7/025
340/538
8,814,046 B1 * 8/2014 Wallner ................... G06K 7/08
235/449

(Continued)

FOREIGN PATENT DOCUMENTS

JP 2003037637 A 2/2003
JP 2010016985 A 1/2010

(Continued)

*Primary Examiner* — Thien M Le
*Assistant Examiner* — Asifa Habib
(74) *Attorney, Agent, or Firm* — Harness, Dickey & Pierce, P.L.C.

(57) ABSTRACT

A magnetic secure transmission (MST) system includes a switching circuit, an inductor, and a control circuit. The control circuit is configured to control the switching circuit to adjust a level of current in the inductor. The inductor current may be adjusted by a first amount over a data transmission period such that the inductor emits a magnetic pulse including a first magnitude. The inductor current may be kept constant during a first sub-period of a data non-transmission period and may be changed by a second amount at a constant slope during a second sub-period of the data non-transmission period, such that the inductor emits a magnetic pulse including a second magnitude during the second sub-period of the data non-transmission period. The second amount is less than the first amount. The first magnitude is greater than a threshold value. The second magnitude is less than the threshold value.

20 Claims, 20 Drawing Sheets

(52) U.S. Cl.
CPC .......... *Y02D 70/144* (2018.01); *Y02D 70/166* (2018.01); *Y02D 70/26* (2018.01); *Y02D 70/42* (2018.01)

(56) References Cited

U.S. PATENT DOCUMENTS

| | | |
|---|---|---|
| 9,697,450 B1* | 7/2017 | Lee .................. G06K 7/086 |
| 2014/0086345 A1 | 3/2014 | Huh et al. |
| 2015/0102683 A1 | 4/2015 | Bae |
| 2015/0235204 A1* | 8/2015 | Wallner ............ G06Q 20/3278 705/39 |
| 2015/0270876 A1* | 9/2015 | Kim .................. H04B 5/0081 455/41.1 |
| 2016/0043568 A1 | 2/2016 | Raghunathan et al. |
| 2016/0056641 A1 | 2/2016 | Hwang et al. |
| 2016/0132865 A1 | 5/2016 | Park et al. |
| 2016/0380627 A1* | 12/2016 | Wyland ............ H03K 17/04123 327/434 |

FOREIGN PATENT DOCUMENTS

| | | |
|---|---|---|
| JP | 5504903 B2 | 5/2014 |
| KR | 20160055680 A | 5/2016 |

\* cited by examiner

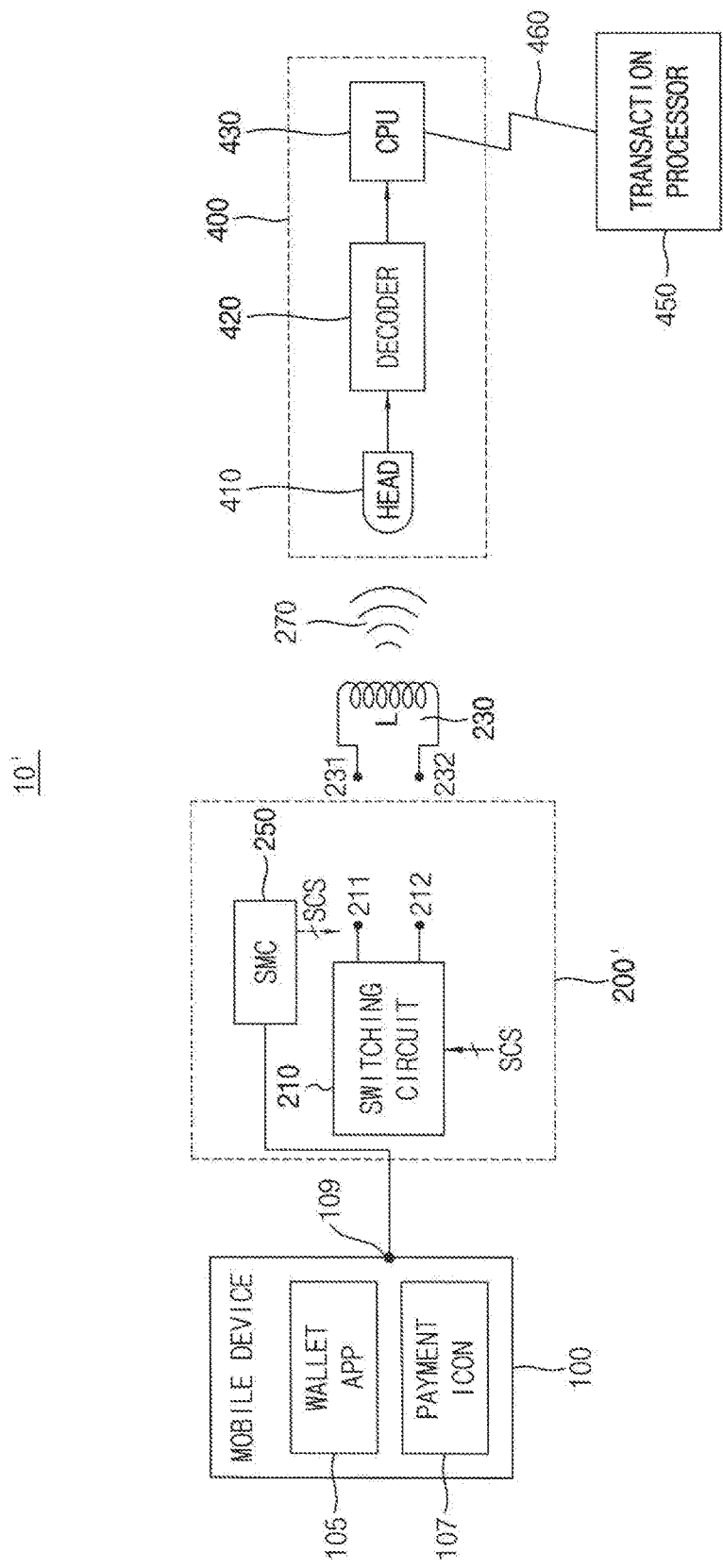

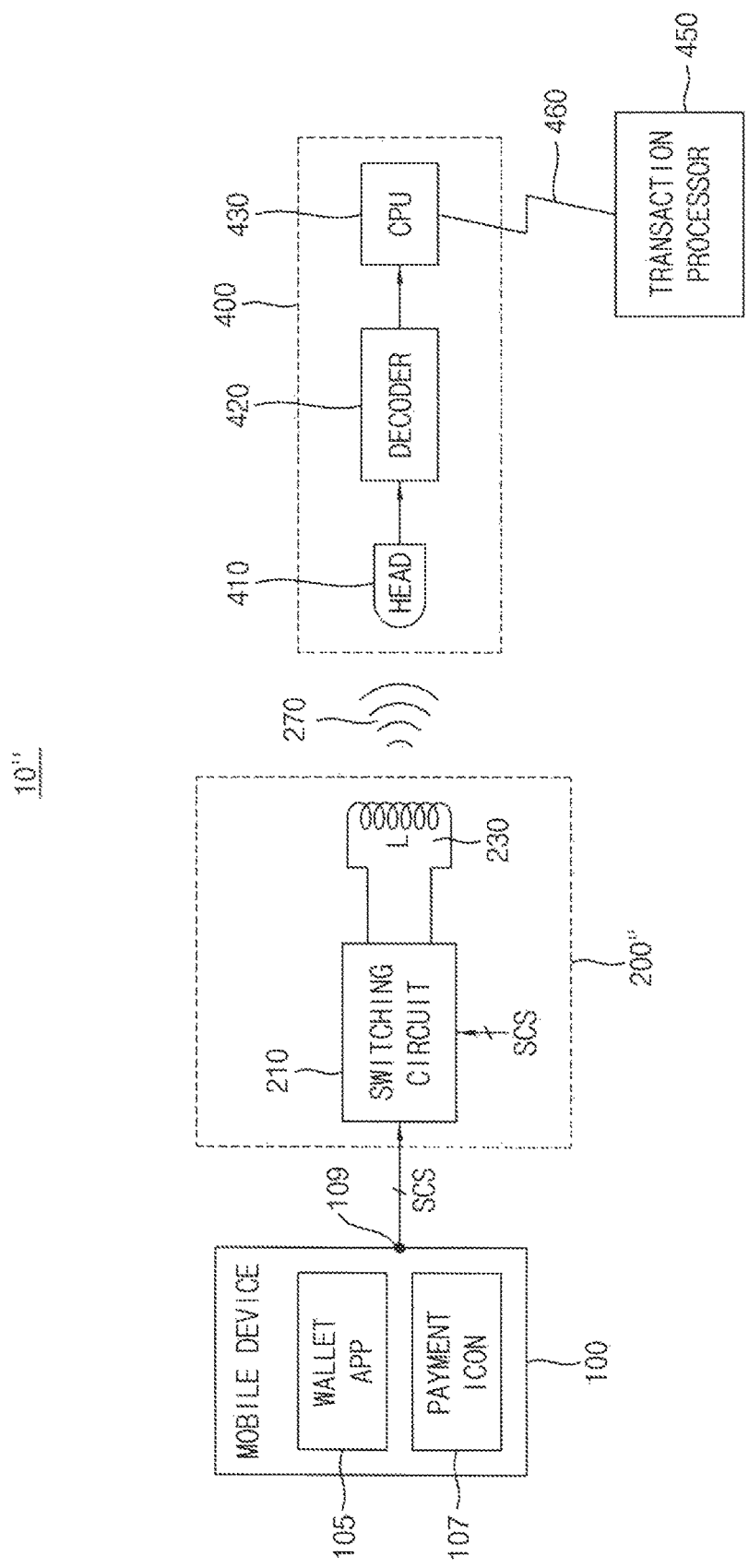

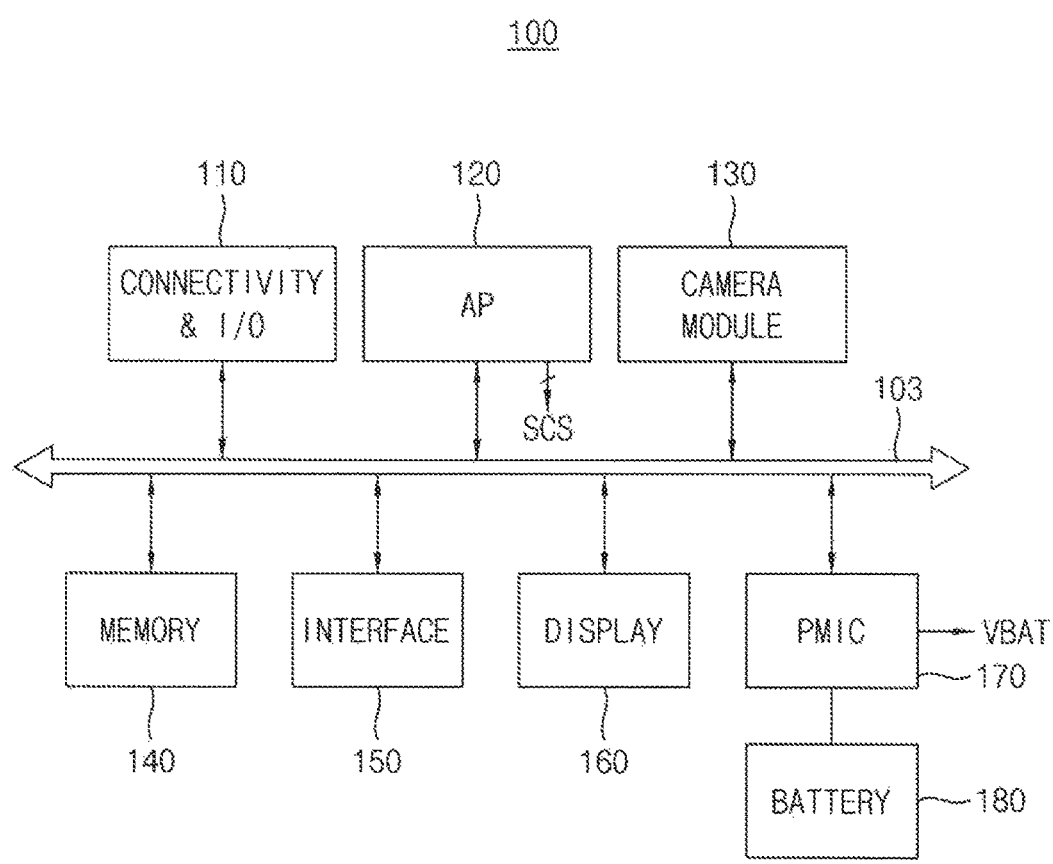

MAGNETIC SECURE TRANSMISSION DEVICE, ELECTRONIC DEVICE AND MOBILE SYSTEM INCLUDING THE SAME

CROSS-REFERENCE TO RELATED APPLICATION(S)

This US application claims the benefit of priority under 35 USC § 119 to Korean Patent Application No. 10-2016-0097850, filed on Aug. 1, 2016, in the Korean Intellectual Property Office, the contents of which are incorporated herein in their entirety by reference.

BACKGROUND

1. Technical Field

The present disclosure relates to non-contactless payment, and more particularly to magnetic secure transmission devices, electronic devices and/or mobile systems including the same, and/or operation methods thereof.

2. Discussion of Related Art

Transmission of magnetic stripe data has been done primarily by swiping a magnetic stripe card against a magnetic stripe reader (MSR) to enable payment, identification (ID), and access control functions. Mobile wallet applications on smartphones and tablets have had difficulty interacting with existing merchant point of sale (POS) devices or other devices with MSRs. Contactless reader enabled POS terminals (typically using, for example, an ISO-14443 standard) are not ubiquitous to accept contactless or near field communications (NFC) payments. It would be expensive and would take time to replace the millions of merchant POS devices (or door locks) that only accept magnetic stripe cards, just to interact with NFC phones or other transmission means like barcodes.

In many countries, the number of contactless payment cards issued is still small compared to the number of magnetic stripe cards issued to consumers. NFC chips with contactless communication capabilities have been embedded in some mobile phones, and are used by companies, such as Google and ISIS, as digital wallets for storing secure cardholder information. These NFC chip based digital wallets can be used in contactless payment transactions with a limited number of NFC capable POS devices, but these NFC chip based digital wallets have significant limitations.

SUMMARY

Some example embodiments may provide a magnetic secure transmission (MST) device capable of reducing power consumption.

Some example embodiments may provide an electronic device including the MST device, capable of reducing power consumption.

Some example embodiments may provide a mobile system including the MST device, capable of reducing power consumption.

According to some example embodiments of inventive concepts, a magnetic secure transmission (MST) system includes an inductor, a switching circuit connected to the inductor, and a control circuit. The control circuit is configured to control the switching circuit to adjust a level of a current in the inductor by a first amount over a data transmission period, such that the inductor emits a magnetic pulse including a first magnitude during the data transmission period. The control circuit is configured to control the switching circuit to adjust the level of the current in the inductor such that the level of the current in the inductor is maintained at a constant level during a first sub-period of a data non-transmission period, the level of the current in the inductor changes a second amount at a constant slope during a second sub-period of the data non-transmission period, and the inductor emits a magnetic pulse including a second magnitude during the second sub-period of the data non-transmission period. The second amount is less than the first amount. The first magnitude is greater than a threshold value corresponding to a noise level. The second magnitude is less than the threshold value.

According to some example embodiments of inventive concepts, a magnetic secure transmission (MST) device includes a switching circuit and a control circuit coupled to the switching circuit. The switching circuit includes a first port and a second port that are configured to connect to a first end and a second end, respectively, of an inductor external to the MST. The control circuit is configured control the switching circuit to adjust a level of a current in the inductor if the first end and the second end of the inductor are connected to the first port and the second port of the switching circuit. The control circuit is configured to control the switching circuit to adjust the level of the current in the inductor by a first amount such that the inductor emits a magnetic pulse including a first magnitude during a data transmission period. The control circuit is configured to control the switching circuit to adjust the level of the current in the inductor such that the level of the current in the inductor is maintained at a constant level during a first sub-period of a data non-transmission period, the level of the current in the inductor changes a second amount at a constant slope during a second sub-period of the data non-transmission period, and the inductor emits a magnetic pulse including a second magnitude during the second sub-period of the data non-transmission period. The second amount is less than the first amount. The first magnitude is greater than a threshold value corresponding to a noise level. The second magnitude is less than the threshold value.

According to some example embodiments of inventive concepts, a magnetic secure transmission (MST) device includes an inductor, a switching circuit connected to the inductor, and a control circuit coupled to the switching circuit. The control circuit is configured to control the switching circuit to adjust a level of a current in the inductor by a first amount such that the inductor emits a magnetic pulse including a first magnitude during a data transmission period. The control circuit is configured to control the switching circuit to adjust the level of the current in the inductor such that the level of the current in the inductor is maintained at a constant level during a first sub-period of a data non-transmission period, the level of the current in the inductor changes a second amount at a constant slope during a second sub-period of the data non-transmission period, and the inductor emits a magnetic pulse including a second magnitude during the second sub-period of the data non-transmission period. The second amount is less than the first amount. The first magnitude is greater than a threshold value corresponding to a noise level. The second magnitude is less than the threshold value.

According to some example embodiments of inventive concepts, a controller includes a memory and an application processor coupled to the memory. The application processor is configured to provide switching control signals to a switching circuit coupled to an inductor for adjusting a level of a current in the inductor. The application processor is configured to control the switching circuit to adjust the level of the current in the inductor by a first amount over a data transmission period, such that the inductor emits a magnetic pulse including a first magnitude during the data transmission period. The application processor is configured to control the switching circuit to adjust the level of the current in the inductor such that the level of the current in the inductor is maintained at a constant level during a first sub-period of a data non-transmission period, the level of the current in the inductor changes a second amount at a constant slope during a second sub-period of the data non-transmission period, and the inductor emits a magnetic pulse including a second magnitude during the second sub-period of the data non-transmission period. The second amount is less than the first amount. The first magnitude is greater than a threshold value corresponding to a noise level. The second magnitude is less than the threshold value.

According to example embodiments, a method of operating a magnetic secure transmission (MST) device including a switching control circuit is provided. The method includes setting the switching control circuit to a first data transmission mode and setting the switching control circuit to a first data non-transmission mode. The setting the switching control circuit to a first data transmission mode includes supplying a first voltage to a first node of the switching control circuit for a first duration and supplying a second voltage to a second node of the switching control circuit for the first time duration. A magnitude of the first voltage is greater than a magnitude of the second voltage. The setting the switching control circuit to the first data non-transmission mode includes supplying equal voltages to the first and second nodes of the switching control circuit during a first sub-period of the first data non-transmission mode, and supplying the first and second voltages to the first and second nodes, respectively, of the switching control circuit during a second sub-period of the first data non-transmission mode.

Accordingly, the MST device and associated systems may reduce power consumption in data non-transmission period in which an inductor in the MST device does not emit magnetic stripe data by controlling an inductor current in the data non-transmission period such that the inductor current increases or decreases step-wisely with at least one constant slope.

BRIEF DESCRIPTION OF THE DRAWINGS

Illustrative, non-limiting example embodiments will be more clearly understood from the following detailed description taken in conjunction with the accompanying drawings.

FIGS. 1A to 1C are block diagrams illustrating payment systems including magnetic secure transmission (MST) devices according to some example embodiments.

FIG. 2 is a block diagram illustrating an example of the mobile device in FIGS. 1A to 1C according to some example embodiments.

DETAILED DESCRIPTION

Various non-limiting embodiments will be described more fully hereinafter with reference to the accompanying drawings, in which some example embodiments are shown.

Figure 1A:
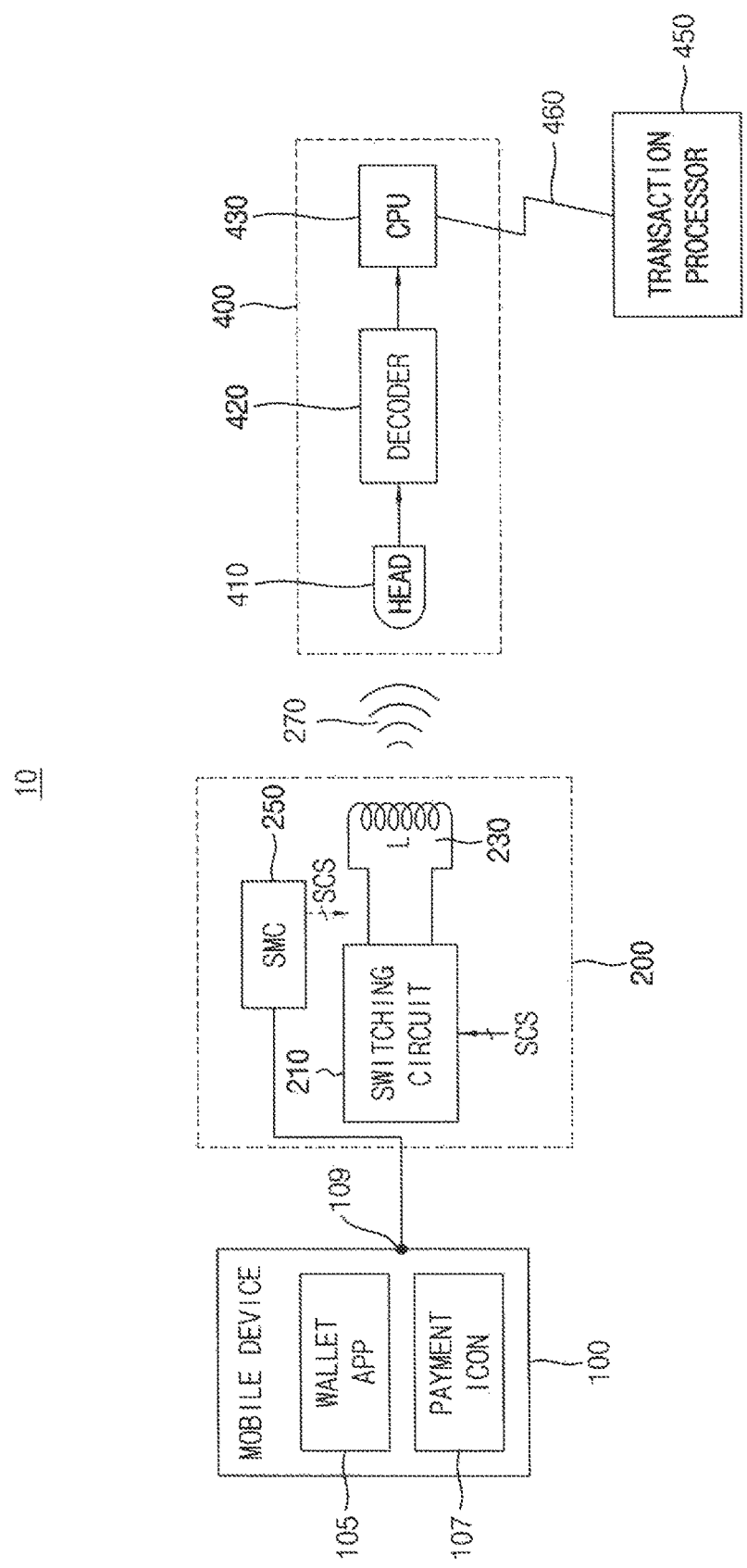

FIGS. 1A to 1C are block diagrams illustrating payment systems including magnetic secure transmission (MST) devices according to some example embodiments.

Referring to FIG. 1A, in some example embodiments, a payment system (or an electronic system) 10 includes mobile device 100, a MST device 200, a POS terminal 400 and a transaction processor 450. The mobile device 100 and the MST device 200 may be referred to as an electronic device. The MST device 200 may be coupled to the mobile device 100 through an input/output (I/O) interface 109 of the mobile device 100. The I/O interface 109 may include an audio jack or an earphone jack of the mobile device, but is not limited thereto. The MST device 200 may be provided as a form of a dongle or a capsule which is coupled to the I/O interface 109.

The mobile device 100 may be a smart phone and may include a wallet software application (or, payment wallet application) 105 loaded in the mobile device 100. The POS terminal 400 includes a magnetic stripe reader head 410, a decoder 420 and a central processing unit (CPU) 430.

To make a payment at a POS location equipped with a common card payment terminal capable of reading standard ISO/ABA magnetic stripe cards 400, the consumer selects the wallet application 105 on his the mobile device 100 and selects one of the pre-loaded payment cards he wants to use for the payment. The consumer holds the mobile device 100 close (e.g., about 1 to 2 inches) to the POS terminal 400 and presses the payment icon/key 107 on the mobile device 100.

The wallet application 105 in the mobile device 100 sends to the MST device 200 via the I/O interface 109 a stream of pulses that contain the selected card's magnetic stripe data. The MST device 200 amplifies, shapes and emits the pulses in the form of suitably modulated magnetic impulses 270.

The magnetic impulses 270 are picked up by the magnetic stripe reader head 410 located in the POS terminal 400 and are converted into electrical pulses. The resulting electrical pulses are decoded by decoder 420 and processed by the CPU 430, just like it would process a standard magnetic stripe card that was swiped through its reader slot. The merchant enters the payment amount and the transaction is sent by the POS terminal 400 via the network 460 to the payment transaction processor 450.

The transaction processor 450 returns the transaction authorization and the POS terminal 450 prints a receipt. With the exception of the card entry method, the entire transaction is completed in the same manner as with a standard magnetic stripe card.

The MST device 200 includes an inductor 230, a switching circuit 210 and a secure micro-controller 250. The switching circuit 210 may be coupled to the mobile device 100 through the I/O interface 109. The switching circuit 210 may be coupled to the inductor 230. The switching circuit 210 provides the current path to the inductor 230 such that the inductor current increases or decreases linearly in a data transmission period in which the inductor 230 emits the magnetic pulse 270. The switching circuit 210 provides the current path to the inductor 230 such that the inductor current increases or decreases step-wisely with at least one constant slope in a data non-transmission period in which the inductor 230 does not emit the magnetic pulse 270. The switching circuit 210 may also be referred to as a switching control circuit 210.

The secure micro-controller 250 may be also referred to as a control circuit or a controller. Together, the inductor 230, switching circuit 210, and secure micro-controller 250 (e.g., control circuit) are part of a magnetic secure transmission (MST) system. In some example embodiments, an application processor in the mobile device 100 may provide commands through the I/O interface 109 to the secure micro-controller 250, and the secure micro-controller 250 may generate switching control signals SCS for driving the switching circuit 210 in response to commands received from the application processor in the mobile device 100. However, inventive concepts are not limited thereto. For example, in other example embodiments, the application processor 120 in the mobile device 100 may generate the switching control signals SCS and drive the switching circuit 210.

In some example embodiments, magnetic stripe transmission is used to transmit tokenized card data to the point of sale terminal. For example, the actual payment card number or part of it may be substituted by a cryptographically generated token, which is formatted as track data, including token data formatted to resemble a standard Primary Account Number (PAN). The PAN may contain a valid Bank Identification Number (BIN).

Such token is either downloaded from the card issuer, another online source, or is locally generated. The MST transmission of tokens replaces the transmission of valid card numbers by transmitting cryptographically generated tokens that are valid only for one transaction and thus reduces and/or eliminates the security risk inherent in the standard magnetic stripe, all without the need to change the existing point of sale hardware. In other example embodiments, more than one track data are transmitted in order to increase compatibility with existing point of sale hardware and software. For example, the transmission of Track 1 data may be followed by the transmission of Track 2 data, or Track 2 data may be followed by Track 1 data.

As shown in FIG. 1A, the MST device 200 may also include the secure micro-controller 250 which provides secure local storage of the card data and directly drives the switching circuit 210. The MST device 200 with the secure micro-controller may operate detached from the mobile device 100 in a store-and-transmit mode. In some example embodiments, the MST device 200 further may include volatile and non-volatile memory for the secure storage of card data and other personal information.

Another possible implementation uses BlueTooth™ communications between the mobile device 100 and the MST device 200, where two-way communications is used for enhanced security and flexibility, including the retrieval by the phone of card data stored in the secure element formed by the secure micro-controller 250.

Referring to FIG. 1B, in some example embodiments, a payment system (or an electronic system) 10' may be the same as the payment system 10 in FIG. 1A, except for the following differences. FIG. 1B illustrates a payment system 10' where the inductor 230 is external to the MST device 200' and the switching circuit 210 includes a first port 211 and a second port 212. The first port 211 and the second port 212 may be connected to a first end 231 and a second end 232 of the inductor 230. The connection to the inductor 230 may be reversible. In other words, the first and second ends 231 and 232 of the inductor 230 may be connected to the first and second ports 211 and 212 of the switching circuit 210, disconnected therefrom, and/or reconnected as desired. The secure micro-controller 250 may control the switching circuit 210 to adjust a level of a current in the inductor 230 if the first end 231 and the second end 232 of the inductor 230 are connected to the first port 211 and the second port 212 of the switching circuit 210.

Referring to FIG. 1C, in some example embodiments, a payment system (or an electronic system) 10' may be the same as the payment system 10 in FIG. 1A, except for the following differences. FIG. 1C illustrates a payment system 10" where the secure micro-controller 250 is omitted from the MST device 200". In the payment system 10", the application processor of the mobile device 100 may generate switching control signals SCS for driving the switching circuit 210. The application processor of the mobile device 100 may provide the switching control signals SCS to the switching circuit 210 through the I/O interface 109.

FIG. 1C illustrates an example where the MST device 200" includes both the inductor 230 and the switching circuit 210. However, the MST device 210" may alternatively have a configuration where the inductor 230 is external to the MST device 200" (see e.g., FIG. 1B). In other words, in some example embodiments, both inductor 230 and the secure-microcontroller 250 may be external to the MST device.

FIG. 2 is a block diagram illustrating an example of the mobile device in FIGS. 1A to 1C according to some example embodiments.

Referring to FIG. 2, the mobile device 100 includes an application processor 120, a connectivity and input/output unit 110, a camera module 130, a memory 140, an interface 150, a display 160 and a power management integrated circuit (PMIC) 170, which are connected to each other via a system bus 103. The PMIC 170 may be connected to a rechargeable battery 180 and may provide a battery voltage VBAT.

The application processor 120 may control an overall operation of the mobile device 100.

The connectivity and input/output unit 110 may communicate with an external device, and may receive/output data from/to a user. The connectivity and input/output unit 110 may include a baseband chipset and may perform Bluetooth communication.

The camera module 130 may include an image sensor (e.g., semiconductor device) and may process image frames such as still images or moving images captured by the image sensor in an image-capturing mode. The camera module 130 may display the processed image frames in the display 160. The image frames processed by the camera module 130 may be stored in the memory 140 or may be transmitted to an external device via the connectivity and input/output unit 110.

The memory 140 may store programs for process and control of the application processor 120 and may temporarily store data that are input or output. The memory 140 may include at least one storage media such as a flash memory type, a hard disk type, a multimedia card micro type, a random access memory (RAM) and a read-only memory (ROM). The interface 160 may perform interfacing with the display 160.

The PMIC 170 may provide the battery voltage VBAT for operating the mobile device 100. When the mobile device 100 is a portable device such as a wearable device, capacity of the PMIC 170 is limited. Therefore, a reduction of power consumption of the mobile device 100 is important.

Figure 3A:
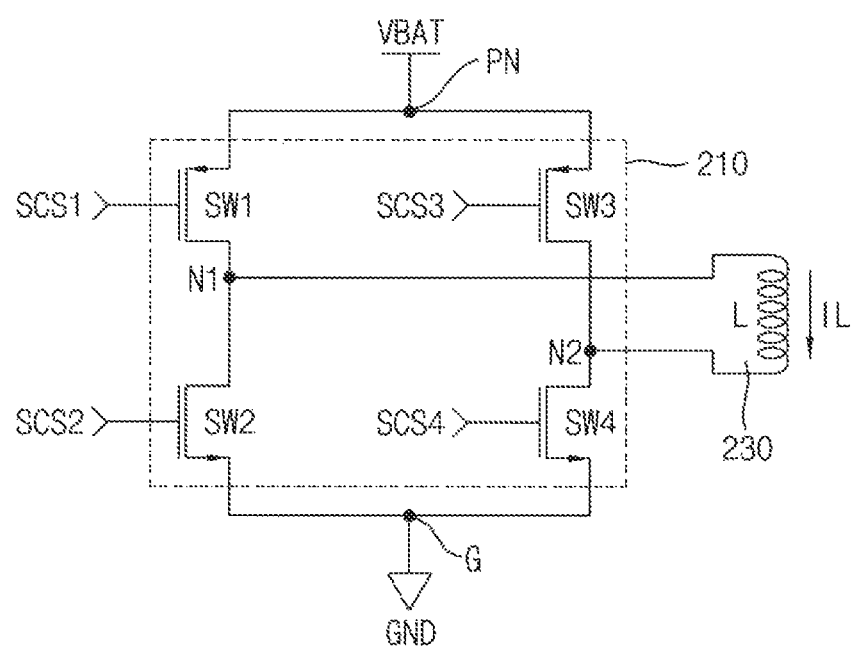
FIG. 3A is a circuit diagram illustrating the switching circuit and the inductor in the MST devices of FIGS. 1A and 1C according to some example embodiments.

FIG. 3A is a circuit diagram illustrating the switching circuit and the inductor in the MST devices of FIGS. 1A and 1C according to some example embodiments.

Referring to FIG. 3A, in some example embodiments, the switching circuit 210 includes first through fourth switching elements SW1~SW4.

The first switching element SW1 may be connected between a power supply node PN and a first node N1 coupled to a first terminal of the inductor 230. The battery voltage VBAT may be supplied to the power supply node PN. The second switching element SW2 may be connected between the first node N and a ground node G coupled to the ground voltage GND. The third switching element SW3 may be connected between the power supply node PN and a second node N2. The second node N2 may be coupled to a second terminal of the inductor 230. The fourth switching element SW4 may be connected between the second node N2 and the ground node G. The first and second switching elements SW1 and SW2 may be serially connected to each other between the power supply node PN. The third and fourth switching elements may be serially connected to each other between the power node PN and the ground node G.

The application processor 120 of the mobile device 100, or the control circuit 250, may apply a first switching control signal SCS1 to the first switching element SW1, a second switching control signal SCS2 to the second switching element SW2, a third switching control signal SCS3 to the third switching element SW3, and a fourth switching control signal SCS4 to the fourth switching element SW4.

In some example embodiments, each of the first through fourth switching elements SW1~SW4 may be implemented with an element that is turned-on/turned-off in response to each of the first through fourth switching control signals SCS1~SCS4. In some example embodiments, the first switching element SW1 and the third switching element SW3 may be implemented with a p-channel metal-oxide semiconductor (PMOS) transistor and the second switching element SW2 and the fourth switching element SW4 may be implemented with an n-channel metal-oxide semiconductor (NMOS) transistor. In other example embodiments, the first and third switching elements SW1 and SW3 may be NMOS transistors and the second, and the second and fourth switching elements SW2 and SW4 may be PMOS transistors. In yet other example embodiments, the first to fourth switching elements SW1~SW4 may be NMOS transistors. Alternatively, the first to fourth switching elements SW1~SW4 may be PMOS transistors.

The first through fourth switching elements SW1~SW4 may be turned on and/or turned-off in response to the first through fourth switching control signals SCS1~SCS4 to provide a current path to an inductor current IL flowing through the inductor 230.

Figure 3B:
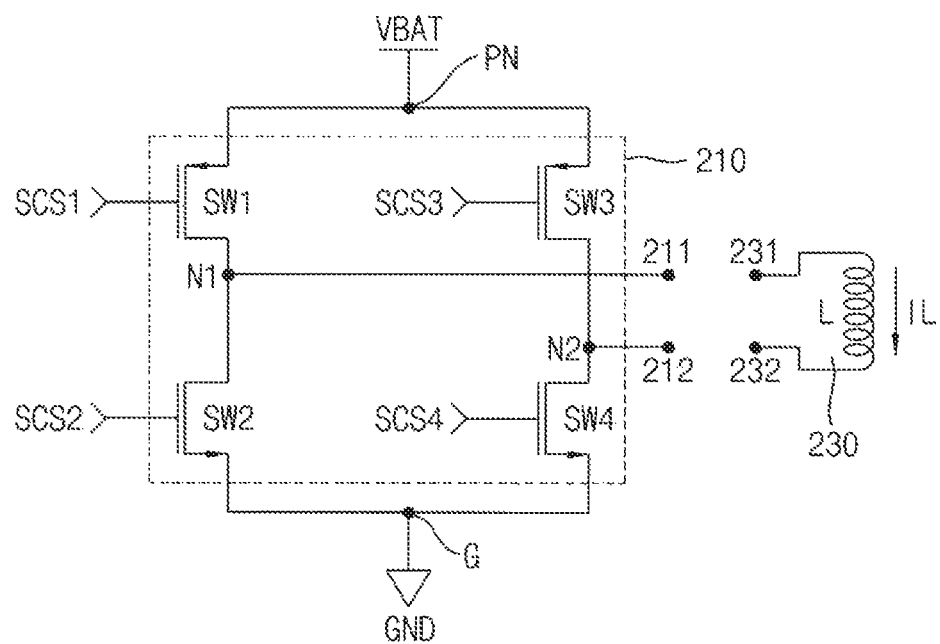
FIG. 3B is a circuit diagram illustrating the switching circuit in the MST device and the inductor of FIG. 1B according to some example embodiments.

FIG. 3B is a circuit diagram illustrating the switching circuit in the MST device and the inductor of FIG. 1B according to some example embodiments.

The switching circuit in FIG. 3B may include a first port 211 connected to the first node N1 and a second port 212 connected to the second node N2. The first and second ports 211 and 212 may be connected and/or disconnected reversibly from the first and second ends 231 and 232 of the inductor 230. One of ordinary skill in the art would appreciate the that the switching circuits 210 in FIGS. 1A and 1C may include the first and second ports 211 and 212, as illustrated in FIG. 3B, and may be connected to the first and second ends 231 and 232 of the inductor 230.

Figure 4:
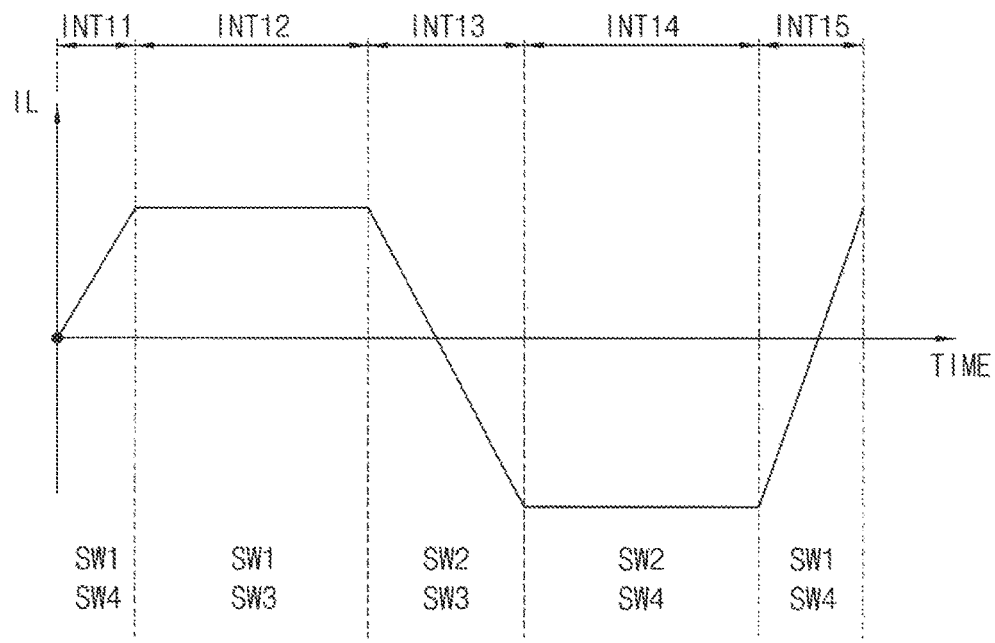
FIG. 4 illustrates an inductor current flowing through the inductor in FIGS. 3A and 3B in a data transmission period and a data non-transmission period in the MST devices in FIGS. 1A to 1C.
Figure 5:
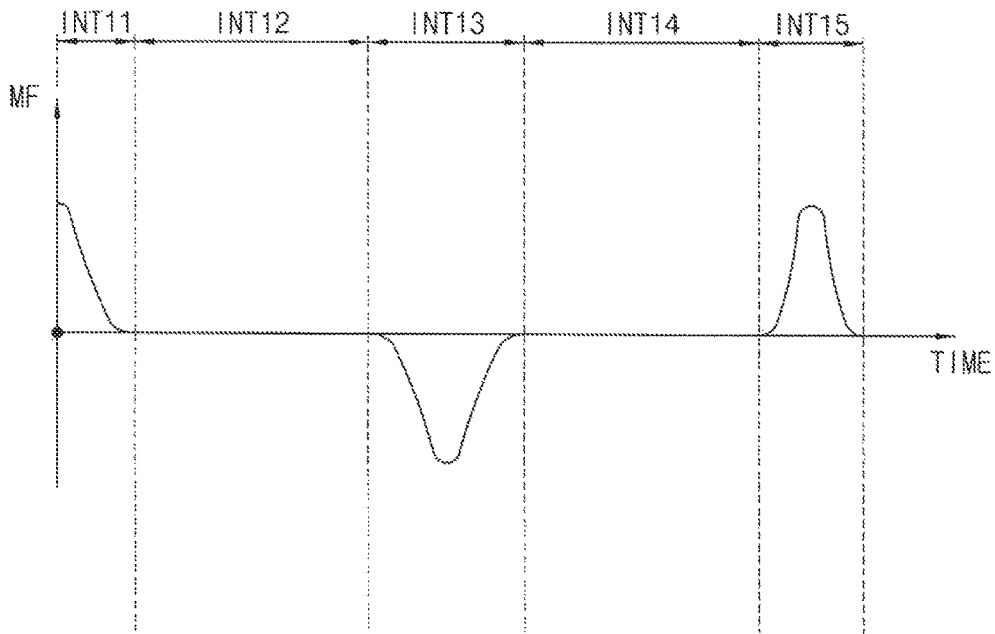
FIG. 5 illustrates a magnetic pulse (or a magnetic field) emitted from the inductor when the inductor current is adjusted as illustrated in FIG. 4.

FIG. 4 illustrates an inductor current flowing through the inductor 230 in FIGS. 3A and 3B in a data transmission period and a data non-transmission period in the MST devices in FIGS. 1A to 1C and FIG. 5 illustrates a magnetic pulse (or a magnetic field) emitted from the inductor when the inductor current is adjusted as illustrated in FIG. 4.

In FIG. 4, each of periods INT11, INT13 and INT15 represents the data transmission period in which the inductor 230 emits the magnetic pulse 270 including the magnetic stripe data and each of periods INT12 and INT14 represents the data non-transmission period in which the inductor 230 does not emit the magnetic pulse 270 including the magnetic stripe data.

In FIG. 4, some switching elements of the first through fourth switching elements SW1~SW4, which are turned-on in each of the periods INT11~INT15 are also illustrated.

Referring to FIGS. 3A, 3B, 4, and 5, when the first switching element SW1 and the fourth switching element SW4 are turned-on in the data transmission period INT11, a current path is formed from the power supply node PN (coupled to the battery voltage VBAT) to the ground node G (coupled to the ground voltage GND) through the first switching element SW1, the inductor 230 and the fourth switching element SW4 and the inductor current IL increases linearly with a slope of VBAT/L (where, L denotes an inductance of the inductor 230). Therefore, the magnetic pulse 270 is emitted according to a change of the inductor current IL in the period INT11.

When the second switching element SW2 and the fourth switching element SW4 are turned-off and the first switching element SW1 and the first switching element SW2 are turned-on in the data non-transmission period INT12, potentials of the first node N1 and the second node N2 are same with respect to each other, and a voltage between the two terminals of the inductor 230 is substantially zero. Therefore, the inductor current IL is not changed and may be maintained at its maximum value. Accordingly, since the inductor current IL is not changed, the magnetic pulse 270 is not emitted in the period INT12.

When the second switching element SW2 and the third switching element SW3 are turned-on in the data transmission period INT13, a current path is formed from the power supply node PN (coupled to the battery voltage VBAT) to the ground node G (coupled to the ground voltage GND) through the third switching element SW3, the inductor 230 and the second switching element SW2 and the inductor current IL decreases linearly with a slope of -VBAT/L. Therefore, the magnetic pulse 270 is emitted according to a change of the inductor current IL in the period INT13.

When the first switching element SW1 and the third switching element SW3 are turned-off and the second switching element SW2 and the fourth switching element SW4 are turned-on in the data non-transmission period INT14, potentials of the first node N1 and the second node N2 are same with respect to each other, and a voltage between the two terminals of the inductor 230 is substantially zero. Therefore, the inductor current IL is not changed and is maintained at its minimum value. Accordingly, since the inductor current IL is not changed, the magnetic pulse 270 is not emitted in the period INT14.

When the first switching element SW1 and the fourth switching element SW4 are turned-on in the data transmission period INT15, a current path is formed from the power supply node PN (coupled to the battery voltage VBAT) to the ground node G (coupled to the ground voltage GND) through the first switching element SW1, the inductor 230 and the fourth switching element SW4 and the inductor current IL increases linearly with the slope of VBAT/L. Therefore, the magnetic pulse 270 is emitted according to a change of the inductor current IL in the period INT15.

Power consumed in the MST device 200 is proportional to an effective value, e.g., root-mean-square (RMS) value of the inductor current IL. When the inductor current IL is maintained at its maximum value in the data non-transmission period INT12 and is maintained at its minimum value in the data non-transmission period INT12, the RMS value of the inductor current IL are in its maximum in the periods INT12 and INT14. Therefore, the power consumed in the MST device 200 has its maximum value in the data non-transmission periods.

Figure 6:
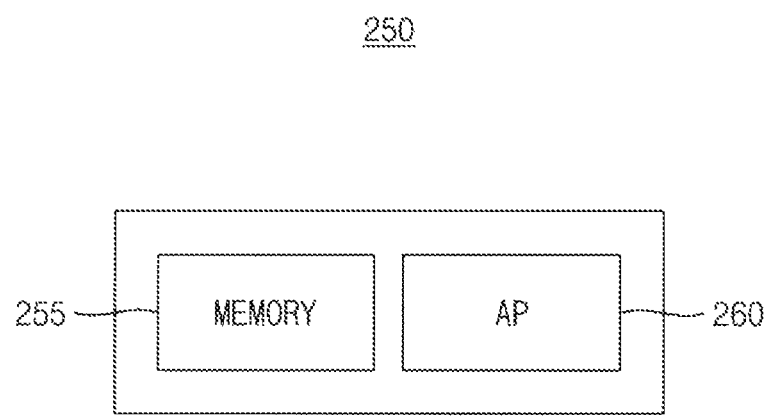
FIG. 6 illustrates an example of a secure micro-controller according to some example embodiments.

FIG. 6 illustrates an example of a secure micro-controller according to some example embodiments.

Referring to FIG. 6, the secure micro-controller 250 may include an application processor 260 coupled to a memory 255. The memory 255 may be a nonvolatile memory, such as a flash memory, a phase-change random access memory (PRAM), a magneto-resistive RAM (MRAM), a resistive RAM (ReRAM), or a ferro-electric RAM (FRAM), or a volatile memory, such as a static RAM (SRAM), a dynamic RAM (DRAM), or a synchronous DRAM (SDRAM). The application processor 260 may be a controller, an application-specific integrated circuit (ASIC), and/or other suitable hardware processing unit, that when, executing instructions stored in the memory 255, configures the secure micro-controller 250 as a special purpose controller to perform operations for driving the switching circuit 210. Examples of driving the switching circuit 210 are described in FIGS. 7-8 and 13-14, but inventive concepts are not limited thereto. The secure micro-controller 250 may generate switching control signals SCS for driving the switching circuit 210 in response to commands received from the application processor 120 in the mobile device 100. The secure micro-controller 250 may improve the functioning of the mobile device (e.g., 200, 200') by reducing the power consumed by the inductor 230 in the data non-transmission periods. Alternatively, in other example embodiments, the application processor 120 and memory 140 of the mobile device 100 may generate the switching control signals SCS for driving the switching circuit 210.

Figure 7:
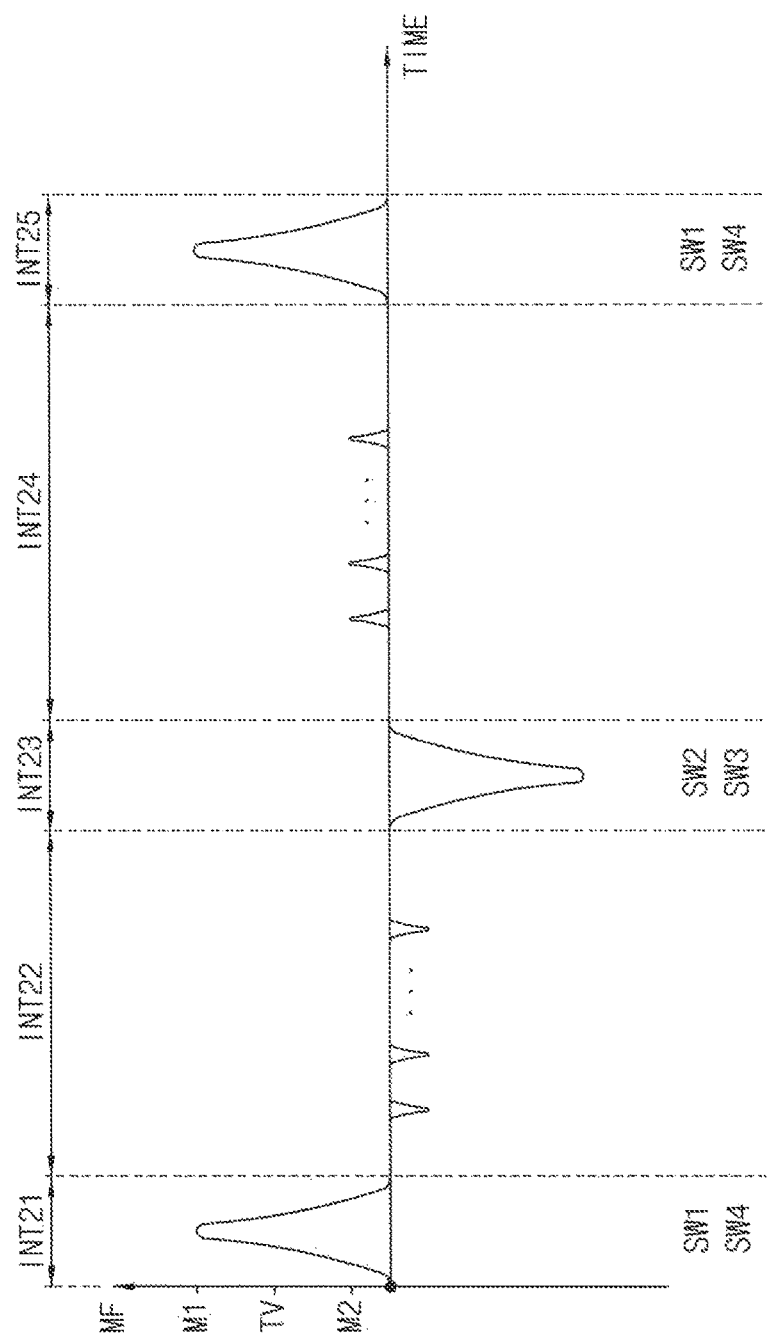
FIG. 7 illustrates a magnetic pulse (or a magnetic field) emitted from the inductor when the inductor current is adjusted as illustrated in FIG. 8.
Figure 8:
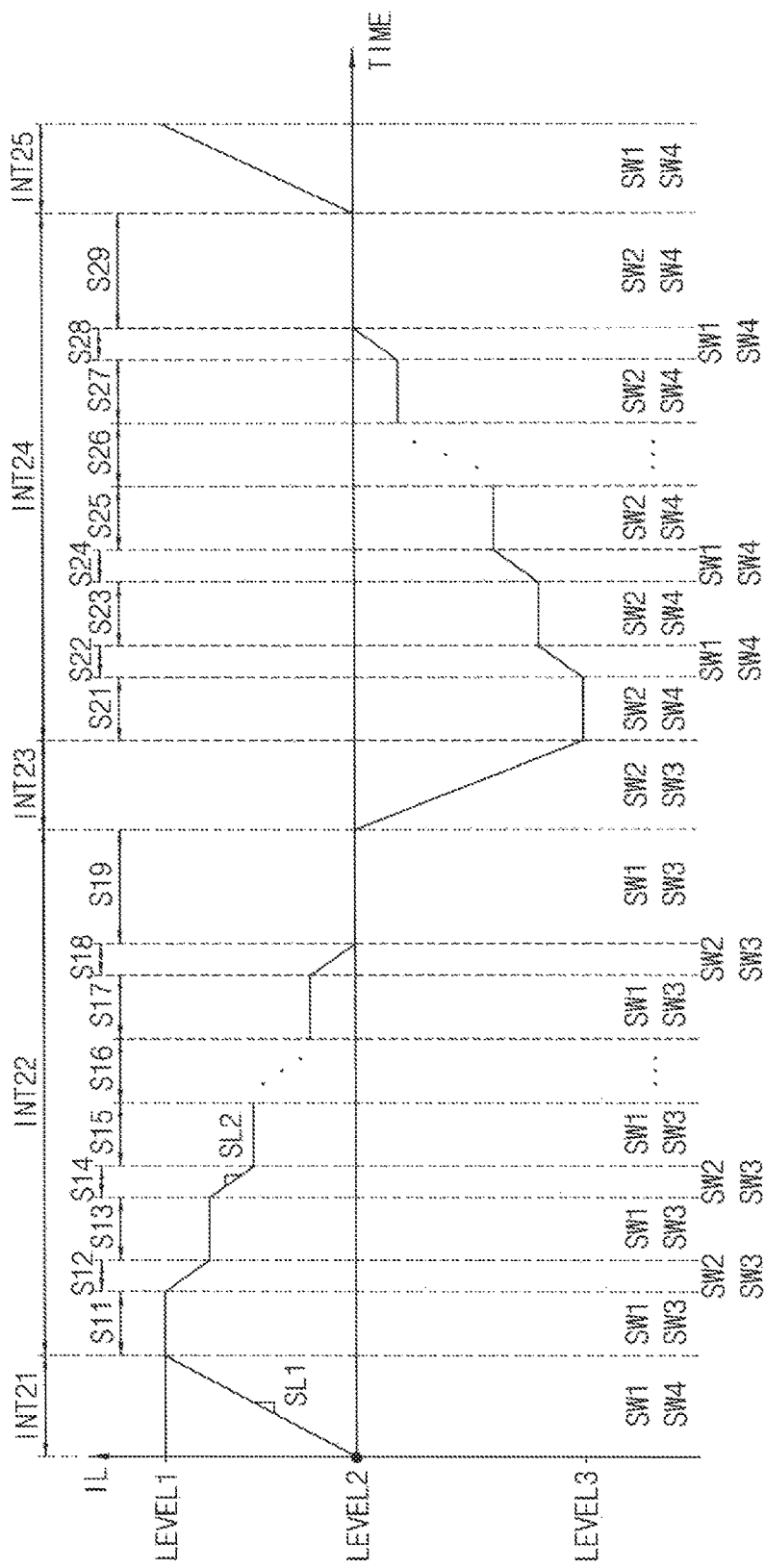
FIG. 8 illustrates an inductor current flowing through the inductor during a data transmission period and a data non-transmission period in the MST devices in FIGS. 1A to 1C according to some example embodiments.

FIG. 8 illustrates an inductor current flowing through the inductor during a data transmission period and a data non-transmission period in the MST devices in FIGS. 1A to 1C according to some example embodiments. FIG. 7 illustrates a magnetic pulse (or a magnetic field) emitted from the inductor when the inductor current is adjusted as illustrated in FIG. 8.

In FIG. 8, each of periods INT21, INT23 and INT25 represents the data transmission period in which the inductor 230 emits the magnetic pulse 270 including the magnetic stripe data and each of periods INT22 and INT24 represents the data non-transmission period in which the inductor 230 does not emit the magnetic pulse 270 including the magnetic stripe data.

In FIG. 8, some switching elements of the first through fourth switching elements SW1~SW4, which are turned-on in each of the periods INT21~INT25 are illustrated.

In FIG. 8, each of the data transmission periods INT21, INT23 and INT25 is substantially the same as or similar to each of the data transmission periods INT11, INT13 and INT15 in FIG. 4, and thus detailed description will be omitted.

Referring to FIGS. 3A through 3C and 7 through 8, in a first data non-transmission period INT22 after the period INT21 in which the inductor current IL increases linearly, the control circuit 250 (or application processor 120 of the mobile device 100) may control on and/or off of the first through fourth switching elements SW1~SW4 using the first through fourth switching control signals SCS1~SCS4 such that a substantial maintenance and a linear decrease of the inductor current IL is alternatingly repeated. The substantial maintenance of the inductor current IL may include a variation of the inductor current IL within a fixed range.

The first data non-transmission period INT 22 may be divided into a plurality of sub-periods S11~S19. The sub-periods S11~S19 may include first sub-periods S11, S13, S15, S17 and S19 in each of which the inductor current IL is maintained and second sub-periods S12, S14, and S18 in each of which the inductor current IL decreases linearly. The control circuit 250 (or application processor 120 of the mobile device 100) may control each interval of the sub-periods S11~S19 individually such that each interval of the sub-periods S11~S19 is the same with respect to each other or is different with respect to one another.

In each of the first sub-periods S11, S13, S15, S17 and S19, the second switching element SW2 and the fourth switching element SW4 are turned-off, the first switching element SW1 and the third switching element SW3 are turned-on, potentials of the first node N1 and the second node N2 are same with respect to each other, and a voltage between the two terminals of the inductor 230 is substantially zero. Therefore, the inductor current IL is maintained at a minimum value of a previous period. The level of the current in the inductor may be maintained at a constant level during each of the first sub-periods S11, S13, S15, S17 and S19. Accordingly, since the inductor current IL is not changed, the inductor 230 does not emit the magnetic pulse 270 in each of the first sub-periods S11, S13, S15, S17 and S19.

In each of the second sub-periods S12, S14, and S18, the second switching element SW2 and the third switching element SW3 are turned-on, a current path is formed from the power supply node PN (coupled to the battery voltage VBAT) to the ground node G (coupled to the ground voltage GND) through the third switching element SW3, the inductor 230 and the second switching element SW2 and the inductor current IL decreases linearly with a slope of –VBAT/L. The level of the current in the inductor may increase a second amount at a constant slope (e.g., –VBAT/L) during the second sub-periods S12, S14, and S18. The level of current change in the inductor during the second sub-periods S12, S14, and S18 is less than the level of current change in the inductor during the a data transmission period (e.g., INT21).

Therefore, the inductor 230 emits the magnetic pulse 270 according to a change of the inductor current IL in each of the second sub-periods S12, S14, and S18. However, since an intensity of the magnetic pulse 270 is very small, the magnetic stripe reader header 410 does not detect the magnetic pulse 270.

In some example embodiments, the control circuit 250 (or application processor 120 of the mobile device 100) may adjust an on-time in which the second switching element SW2 and the third switching element SW3 are turned-on to adjust the intensity of the magnetic pulse 270. That is, the control circuit 250 may adjust an on-time of the second witching element SW2 and the third switching element SW3 such that the magnetic pulse 270 is not detected by the magnetic stripe reader header 410.

In the sub-period S16, a substantial maintenance and a linear decrease of the inductor current IL may be alternatingly repeated.

In a second data non-transmission period INT24 after the period INT23 in which the inductor current IL decreases linearly, the control circuit 250 (or application processor 120 of the mobile device 100) controls on and/or off of the first through fourth switching elements SW1~SW4 using the first through fourth switching control signals SCS1~SCS4 such that a substantial maintenance and a linear increase of the inductor current IL is alternatingly repeated.

The second data non-transmission period INT 24 may be divided into a plurality of sub-periods S21~S29. The sub-periods S21~S29 may include first sub-periods S21, S23, S25, S27 and S29 in each of which the inductor current IL is maintained and second sub-periods S22, S24, and S28 in each of which the inductor current IL increases linearly. The control circuit 250 may control each interval of the sub-periods S21~S29 individually such that each interval of the sub-periods S21~S29 is the same with respect to each other or is different with respect to one another.

In each of the first sub-periods S21, S23, S25, S27 and S29, the second switching element SW2 and the fourth switching element SW4 are turned-on, the first switching element SW1 and the third switching element SW3 are turned-off, potentials of the first node N1 and the second node N2 are same with respect to each other, and a voltage between the two terminals of the inductor 230 is substantially zero. Therefore, the inductor current IL is maintained at a minimum value of a previous period. Accordingly, since the inductor current IL is not changed, the inductor 230 does not emit the magnetic pulse 270 in each of the first sub-periods S21, S23, S25, S27 and S29.

In each of the second sub-periods S22, S24, and S28, the first switching element SW1 and the fourth switching element SW4 are turned-on, a current path is formed from the power supply node PN (coupled to the battery voltage VBAT) to the ground node G (coupled to the ground voltage GND) through the first switching element SW1, the inductor 230 and the fourth switching element SW4 and the inductor current IL increases linearly with a slope of VBAT/L.

Therefore, the inductor 230 emits the magnetic pulse 270 according to a change of the inductor current IL in each of the second sub-periods S22, S24, and S28. However, since an intensity of the magnetic pulse 270 is very small, the magnetic stripe reader header 410 does not detect the magnetic pulse 270. In some example embodiments, the control circuit 250 may adjust an on-time in which the first switching element SW1 and the fourth switching element SW4 are turned-on to adjust the intensity of the magnetic pulse 270. That is, the control circuit 250 may adjust an on-time of the first witching element SW1 and the fourth switching element SW4 such that the magnetic pulse 270 is not detected by the magnetic stripe reader header 410.

In the sub-period S26, a substantial maintenance and a linear decrease of the inductor current IL may be alternatingly repeated.

Although it is illustrated that the first data non-transmission period INT22 precedes the second data non-transmission period INT24 in FIG. 8, in some example embodiments, the second data non-transmission period INT24 may precede the first data non-transmission period INT22 according to linear increase and decrease of the inductor current IL in the data transmission period.

A level of a current in the inductor may be adjusted by a first amount (e.g., from Level 2 to Level 1 , and/or from Level 2 to Level 3 in FIG. 8) over a data transmission period (e.g., INT21, INT23), such that the inductor 230 emits a magnetic pulse including a first magnitude M1 during the data transmission period (e.g., INT 21). Level 2 may be 'zero.' A direction of the current of the inductor at Level 1 is opposite a direction of the current of the inductor at Level 3. Level 2 is between Levels 1 and 3. The first magnitude M1 may be greater than a threshold value TV corresponding to a noise level. The magnetic pulses during the data non-transmission periods INT22 and INT24 have magnitudes below magnitudes of the threshold value TV.

The current changes in the inductor in two different data transmission periods (e.g., INT21 and INT23) may have the same magnitude, and the magnetic pulses in two different data transmission periods (e.g., INT21 and INT23) may have the same magnitude. A magnitude of Level 1 may be equal to a magnitude of Level 3. However, inventive concepts are not limited thereto.

The control circuit 250 (or application processor 120 of the mobile device 100) may adjust the level of current in the inductor by a first slope SL1 during a data transmission period (e.g., INT31) and adjust the level of the current by a second slope SL2 during the second sub-periods of a data non-transmission period (e.g., second sub-periods S12, S14, S16, and S18) such that the inductor 230 emits a magnetic pulse including a second magnitude M2 below magnitudes of the threshold value TV during the second sub-periods of the data non-transmission period. A magnitude of the first slope S1 may be different than a magnitude of the second slope S2.

The control circuit 250 (or application processor 120) may adjust the current stepwise during the data non-transmission periods INT22 and INT24, and the current of the inductor during a first sub-period and second sub-period directly adjacent to each other (e.g., S11 and S12) may define a step of a stepwise pattern corresponding to how the current of the inductor is adjusted during the data non-transmission periods INT22 and INT24.

Figure 9:
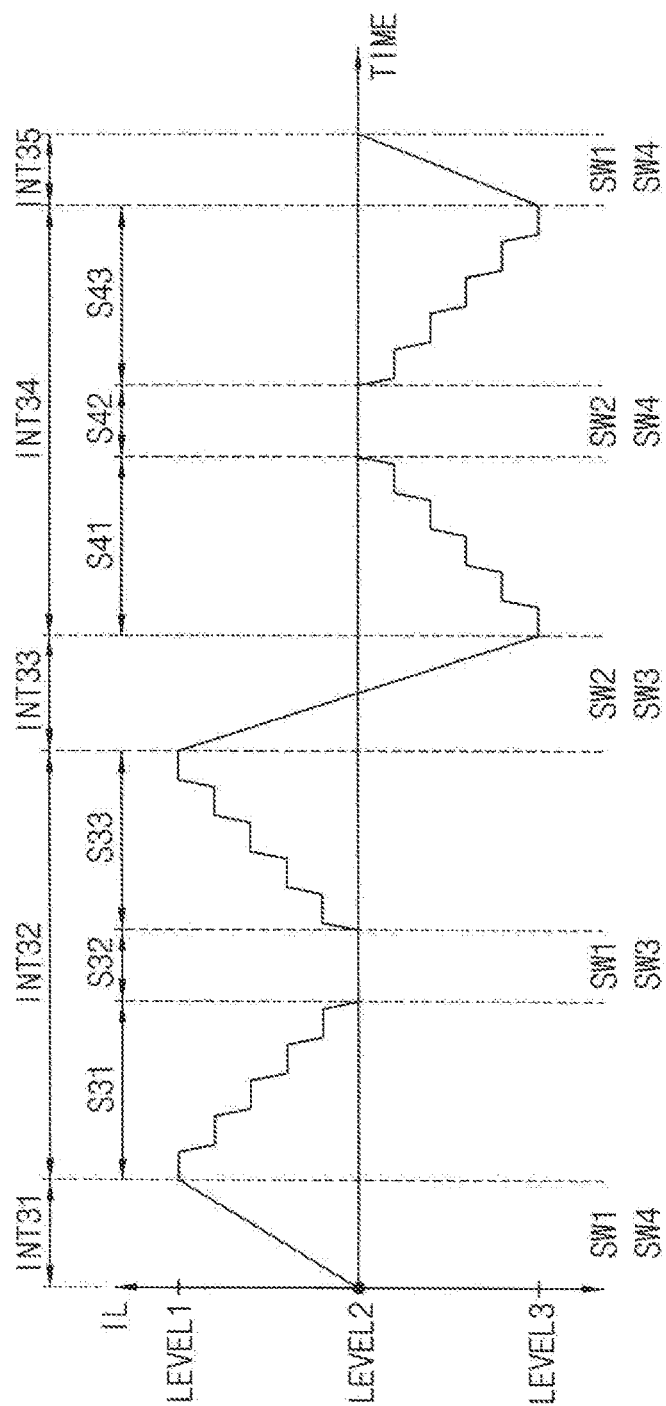
FIG. 9 illustrates an inductor current flowing through the inductor in FIGS. 3A and 3B in a data transmission period and a data non-transmission period in the MST device in FIGS. 1A to 1C according to some example embodiments.

FIG. 9 illustrates an inductor current flowing through the inductor in FIGS. 3A and 3B in a data transmission period and a data non-transmission period in the MST devices in FIGS. 1A to 1C according to some example embodiments.

In FIG. 9, each of periods INT31, INT33 and INT35 represents the data transmission period in which the inductor 230 emits the magnetic pulse 270 including the magnetic stripe data and each of periods INT32 and INT34 represents the data non-transmission period in which the inductor 230 does not emit the magnetic pulse 270 including the magnetic stripe data.

In FIG. 9, some switching elements of the first through fourth switching elements SW1~SW4, which are turned-on in each of the periods INT31~INT35 are also illustrated.

In FIG. 9, each of the data transmission periods INT31, INT33 and INT35 is substantially the same as or similar to each of the data transmission periods INT11, INT13 and INT15 in FIG. 4, and thus detailed description will be omitted.

Referring to FIGS. 3A, 3B, and 9, in a first data non-transmission period INT32 after the period INT31 in which the inductor current IL increases linearly, the control circuit 250 (or application processor 120) controls on and/or off of the first through fourth switching elements SW1~SW4 using the first through fourth switching control signals SCS1~SCS4 such that a substantial maintenance and a linear decrease of the inductor current IL is alternatingly repeated in a first sub-period S31, the inductor current IL is maintained at 'zero' in a second sub-period S32 successive to the first sub-period S31 and a substantial maintenance and a linear increase of the inductor current IL is alternatingly repeated in a third sub-period S33 successive to the second sub-period S32. The first data non-transmission period INT32 includes the first through third sub-periods S31, S32 and S33. The operation of the switching circuit 210 in the first sub-period S31 may be substantially similar to the operation of the switching circuit 210 in the sub-periods S11~S18 in the first data non-transmission period INT22. The operation of the switching circuit 210 in the third sub-period S33 may be substantially similar to the operation of the switching circuit 210 in the sub-periods S21~S28 in the second data non-transmission period INT24.

In a second data non-transmission period INT34 after the period INT33 in which the inductor current IL decreases linearly, the control circuit 250 (or application processor 120) controls on and/or off of the first through fourth switching elements SW1~SW4 using the first through fourth switching control signals SCS1~SCS4 such that a substantial maintenance and a linear increase of the inductor current IL is alternatingly repeated in a first sub-period S41, the inductor current IL is maintained at 'zero' in a second sub-period S42 successive to the first sub-period S41, and a linear decrease and a substantial maintenance of the inductor current IL is alternatingly repeated in a third sub-period S43 successive to the second sub-period S42.

The second data non-transmission period INT34 includes the first through third sub-periods S41, S42 and S43. The operation of the switching circuit 210 in the first sub-period S41 may be substantially similar to the operation of the switching circuit 210 in the sub-periods S21~S28 in the second data non-transmission period INT24. The operation of the switching circuit 210 in the third sub-period S43 may be substantially similar to the operation of the switching circuit 210 in the sub-periods S11~S18 in the first data non-transmission period INT22.

The first and second data non-transmission periods INT32 and INT34 may correspond to a first mode and a second mode, respectively, of operation. During the first data non-transmission period INT32 (or first mode), the control circuit 250 (or application processor 120) may control the switching circuit 210 to decrease the current of the inductor from Level 1 to Level 2 in a first stepwise pattern during the first sub-period 31, maintain the current at Level 2 during the second sub-period S32, and increase the current of the inductor from Level 2 to Level 1 in a third stepwise pattern during the second sub-period S33. During the second data non-transmission period INT34 (or second mode), the control circuit 250 (or application processor 120) may decrease the current of the inductor from Level 3 to Level 2 in a second stepwise pattern during the first sub-period S41, maintain the current at Level 2 during the second sub-period S42, and increase the current of the inductor from the Level 2 to Level 3 in a fourth stepwise pattern during the third sub-period S43. The first and fourth stepwise patterns may be the same, and the second and third stepwise patterns may be the same. The first and second stepwise patterns may be different, and the third and fourth stepwise patterns may be different.

Referring to FIGS. 1, 2, 3A, 3B, and 9, the control circuit 250 (or application processor 120) may change a polarity of the inductor 230 between a first polarity and a second polarity that is opposite the first polarity by driving the switching circuit 210. For example, the control circuit 250 (or application processor 120) may generate switching control signals SCS1~SCS4 to turn the first and fourth switches SW1 and SW4 on and the second and third switches SW2 and SW3 off, which changes the inductor 230 to a first polarity by forming a current path from the power supply node PN (coupled to the battery voltage VBAT) to the ground node G (coupled to the ground voltage GND) through the first switching element SW1, the inductor 230 and the fourth switching element SW4. Also, the control circuit 250 (or application processor 120) may generate switching control signals SCS1~SCS4 to turn the first and fourth switches SW1 and SW4 off and the second and third switches SW2 and SW3 on, which changes the inductor 230 to a second polarity by forming a current path from the power supply node PN (coupled to the battery voltage VBAT) to the ground node G (coupled to the ground voltage GND) through the second switching element SW2, the inductor 230, and the third switching element SW3.

The first and second data transmission periods INT31 and INT33 may be referred to as a first type and a second type of data transmission period, respectfully. The first type of the data transmission period (e.g., INT31) may be before (e.g., directly before or indirectly before) an adjacent one of the data non-transmission period according to the first mode (e.g., INT32) and after (e.g., directly after or indirectly after) an adjacent one of the data non-transmission period according to the second mode (e.g., INT34). The second type of the data transmission period (e.g., INT33) may be before (e.g., directly before or indirectly before) the adjacent one of the data non-transmission period according to the second mode (e.g., INT34) and after (e.g., directly after or indirectly after) the adjacent one of the data non-transmission period according to the first mode (e.g., INT32).

Although it is illustrated that the first data non-transmission period INT32 precedes the second data non-transmission period INT34 in FIG. 9, in some example embodiments, the second data non-transmission period INT34 may precede the first data non-transmission period INT32 according to linear increase and decrease of the inductor current IL in the data transmission period. In addition, the control circuit 250 (or application processor 120) may adjust a first interval in which the inductor current IL is substantially maintained, a second interval in which the inductor current IL increases linearly and a third interval in which the inductor IL decreases linearly decreases, individually.

The control circuit 250 (or application processor 120) may adjust a time interval of the data non-transmission periods (e.g., INT22 and INT24 in FIGS. 7-8, INT32 and INT34 in FIG. 9) between a first value and a second value that are different from each other. Accordingly, based on adjusting the time interval of the data non-transmission periods (e.g., INT22 and INT24 in FIGS. 7-8, INT32 and INT34 in FIG. 9) between the first and second values, the control circuit 250 (or application processor 120) may modulate the frequency of the data transmission periods (e.g., INT21, INT23, and INT25 in FIGS. 7-8, INT31, INT33, and INT35). Accordingly, various frequency modulation schemes, such as frequency-shift-keying (FSK) may be used to transmit data using magnetic pulses generated at different frequencies.

Referring to FIGS. 3A, 3B, and 9B, in some example embodiments, a method of operating the MST device includes setting the switching circuit 210 to a first data transmission mode (e.g., INT31) by supplying a first voltage and a second voltage to the first and second nodes N1 and N2 respectively of the switching circuit 210 for a first time duration, setting the switching circuit 210 to a first data non-transmission mode (e.g., INT32) for a first duration, setting the switching circuit 210 to a second data transmission mode (e.g., INT 33) by supplying the second voltage and the first voltage to the first and second nodes N1 and N2 of the switching circuit 210 for a second time duration, and setting the switching circuit 210 to a second data non-transmission mode (e.g., INT32) for a second duration. The first voltage may be a power supply voltage such as VBAT, and the second voltage may be a ground voltage GND. The first duration of the first data non-transmission mode (e.g., INT32) may be different than second duration of the second data non-transmission mode (e.g., INT34).

Setting the switching circuit 210 to the first data non-transmission mode (e.g., INT32) may include supplying equal voltages to the first and second nodes N1 and N2 of the switching circuit 210 during a first part of the first data non-transmission mode, and supplying the first and second voltages to the first and second nodes N1 and N2, respectively, of the switching circuit 210 during a second part of the first data non-transmission mode (e.g., INT32). The first part and the second part may define a step of a stepwise pattern in which the current of the inductor is adjusted during the first data non-transmission mode (See e.g., the step formed by the first sub-period S11 and the second sub-period S12 in FIG. 8). The first time duration of the first data transmission mode (e.g., INT31) may be greater than a duration of either one of the first part and the second part of the first data non-transmission mode (e.g., INT32).

Setting the switching circuit 210 to the second data non-transmission mode (e.g., INT34) may include supplying equal voltages to the first and second nodes N1 and N2 of the switching circuit 210 during a first part of the second data non-transmission mode, and supplying the first and second voltages to the first and second nodes N1 and N2, respectively, of the switching circuit 210 during a second part of the second data non-transmission mode (e.g., INT34). The first part and the second part may define a step of a stepwise pattern in which the current of the inductor is adjusted during the second data non-transmission mode (See e.g., the step formed by the first sub-period S21 and second sub-period S22 in FIG. 8). The second time duration of the second data transmission mode (e.g., INT33) may be greater than a duration of either one of the first part and the second part of the second data non-transmission mode (e.g., INT34).

Figure 10:
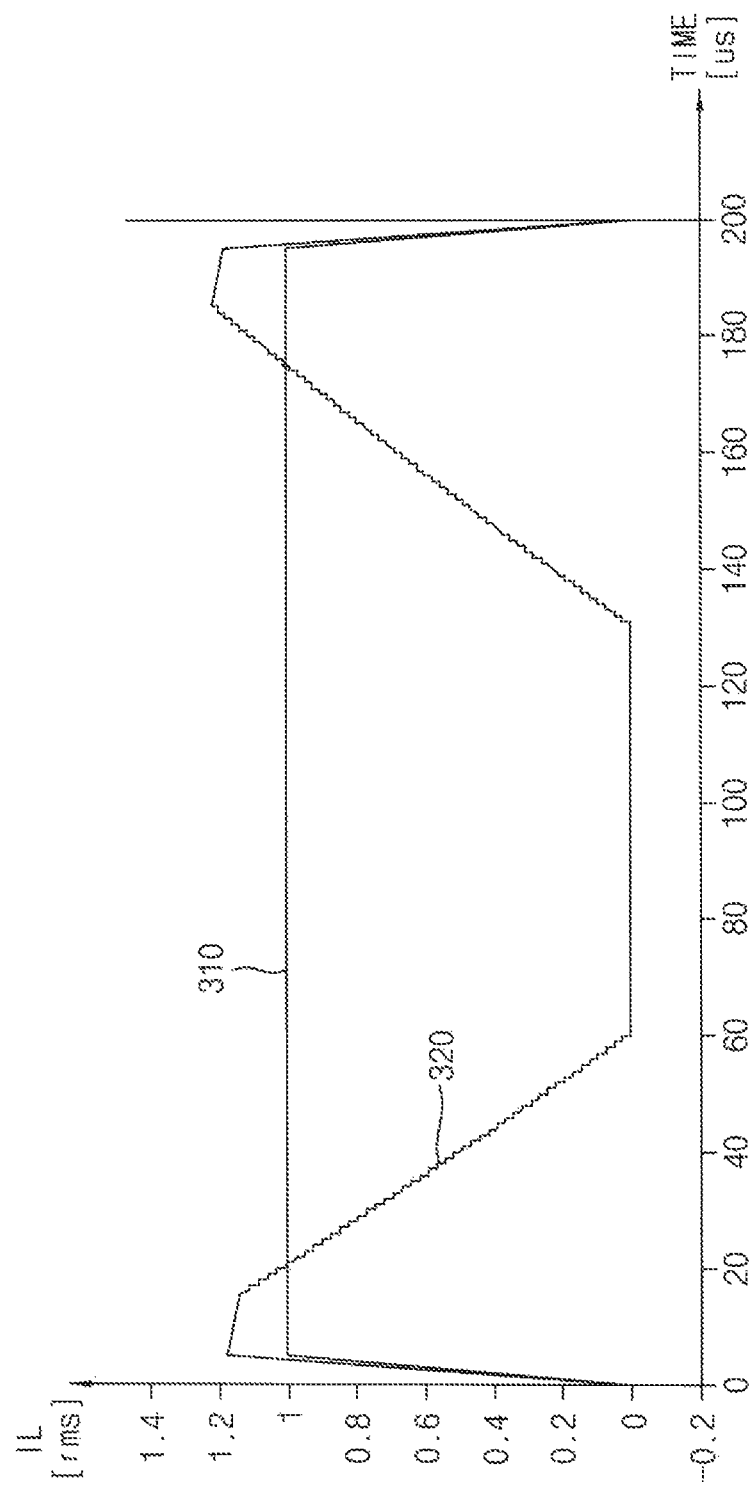
FIG. 10 illustrates the effective value (RMS value) of the inductor current when the inductor current in the MST device in FIG. 3A or FIG. 3B changes as in FIG. 4 and FIG. 9 respectively.

FIG. 10 illustrates the effective value (RMS value) of the inductor current when the inductor current in the MST device in FIGS. 3A and 3B changes as in FIG. 4 and FIG. 9 respectively.

In FIG. 10, a reference numeral 310 represents the RMS value of the inductor current IL when the inductor current IL is driven as shown in FIG. 4 and a reference numeral 320 represents the RMS value of the inductor current IL when the inductor current IL is driven as shown in FIG. 9. Therefore, power consumption of the MST device 200 (or 200' or 200") in case of FIG. 9 is decreased about 60% compared with the power consumption in the MST device 200 (200' or 200") in case of FIG. 4.

When the power consumption of the MST device 200 (200' or 200") is reduced by decreasing the RMS value of the inductor current IL in the data non-transmission period, the MST device 200 (or 200' or 200") may be employed in a wearable device which has limited amount of power supply.

As is noted from FIG. 10, the RMS value of the inductor current IL when the inductor current IL is driven as in FIG. 9 is decreased greatly compared with the RMS value of the inductor current IL when the inductor current IL is driven as in FIG. 4.

Figure 11:
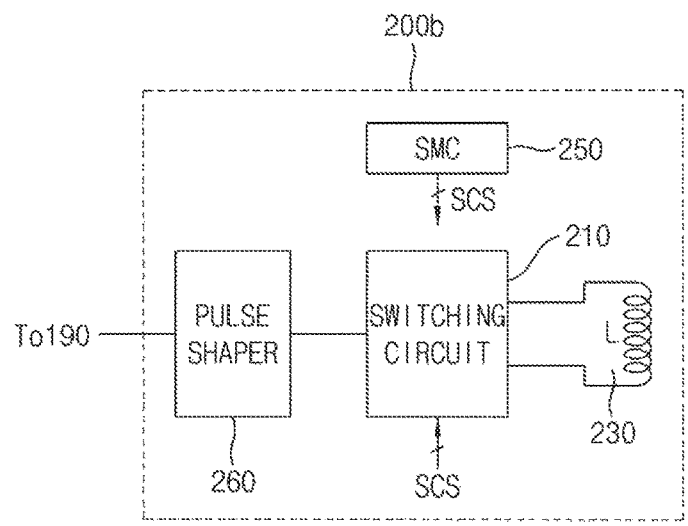
FIG. 11 is a block diagram illustrating an example of a MST device according to some example embodiments.

FIG. 11 is a block diagram illustrating an example of a MST device according to some example embodiments.

An MST device 200b of FIG. 11 is different from the MST device 200 in that the MST device 200b further includes a pulse shaper 260. The MST devices 200' and 200" in FIGS. 1B and 1C may be similarly modified to include the pulse shaper 260.

Referring to FIGS. 1A to 1C and 11, to make a payment at a POS location equipped with a common card payment terminal capable of reading standard ISO/ABA magnetic stripe cards 400, the consumer selects the wallet application 105 on his the mobile device 100 and selects one of the pre-loaded payment cards he wants to use for the payment. The consumer holds the mobile device 100 close (1 to 2 inches) to the POS terminal 400 and presses the payment icon/key 107 on the mobile device 100. The wallet application 105 in the mobile device 100 sends to the MST device 200 via the I/O interface 109 a stream of pulses that contain the selected card's magnetic stripe data.

The pulse shaper 260 shapes the streams of pulse including the magnetic stripe data to a magnetic impulse and provides the magnetic impulse to the inductor 230 through the switching circuit 210.

Figure 12:
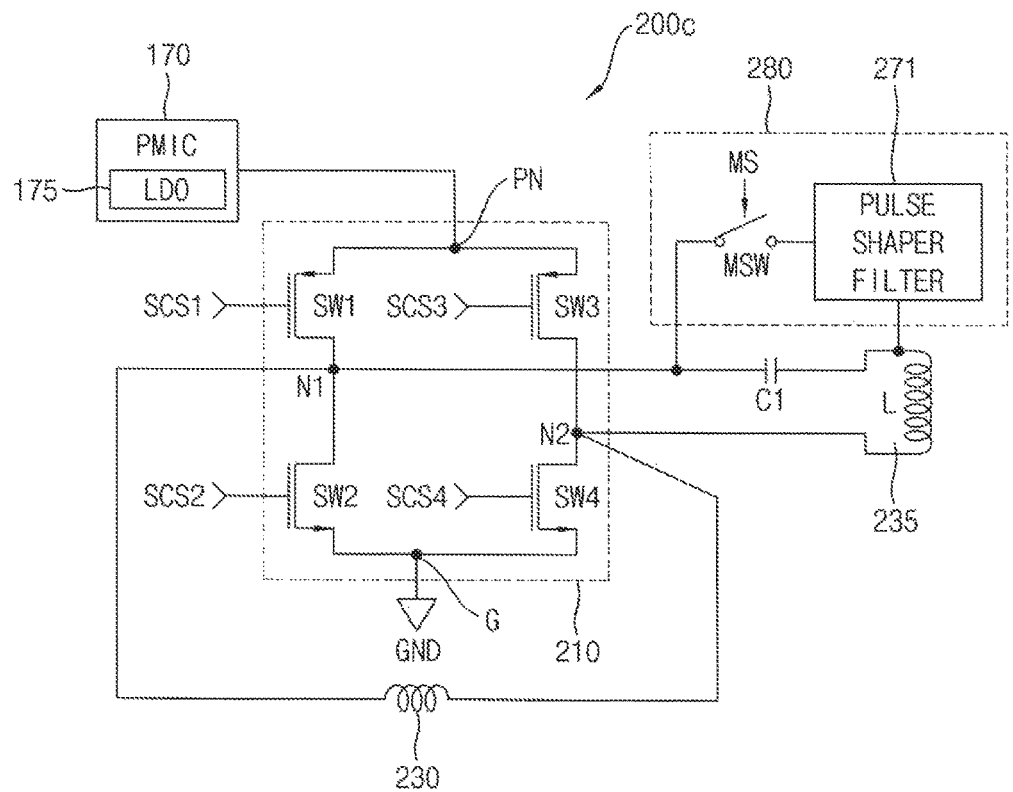
FIG. 12 is a block diagram illustrating another example of a MST device according to some example embodiments.

FIG. 12 is a block diagram illustrating another example of a MST device according to some example embodiments.

In FIG. 12, a low drop-out regulator circuit (LDO) 175 included in the PMIC 170 in the mobile device 100 of FIG. 2 is also illustrated.

Referring to FIG. 12, an MST device 200c may include an inductor 230 that may be referred to as a first inductor, a switching circuit 210, a second inductor 235 connected to switching circuit 235, and an MST module 280. As described above in FIGS. 7-9, the inductor 230 may be used for a MST function, such as emitting magnetic pulses during a data transmission period. The PMIC 170 may be connected to the switching circuit 210. As shown in FIG. 2, the battery 180 may be connected to the PMIC 170. Alternatively, the PMIC 170 may be omitted and the power node PN may connect directly to the battery 180. Although not illustrated in FIG. 12, the secure micro-controller 250 may be also included in the MST device 200c and the secure micro-controller 250 may generate switching control signals SCS for driving the switching circuit 210. Alternatively, like the MST System 10" described in FIG. 1C, the application processor 120 in the mobile device 100 may generate switching control signals SCS for driving the switching circuit 210. Also, in some example embodiments, the switching circuit 210 may include the first and second ports 211 and 212 and may be connected to first and second ends 231 and 232 of the inductor 230, as shown in FIG. 3B. Similarly, in some example embodiments, the switching circuit 210 may include a pair of ports for connecting to respective terminals (or ends) of the inductor 235. In other words, similar to the MST device 200" in FIG. 1C and switching circuit illustrated in FIG. 3B, the switching circuit 210 in FIGS. 12 to 14 may be variously modified Configuration and operation of the switching circuit 210 are described in detail with reference to FIGS. 3A and 3B, and thus detailed description will be omitted.

The MST module 280 may include state switch MSW and a pulse shape filter 271. The state switch MSW may have a turn-on state while the MST device 200, MST device 200', or MST device 200" receives a request for the execution of the MST function according to the control of the application processor 120 or the secure micro-controller 250. The inductor 230 may be used for perform the MST function, as described above. When the MST function is not separately executed, the state switch MSW may have the turn-off state. The MST module 110 may be disposed in parallel to a first capacitor C1 connected to the first node N1 between the first node N1 and the first terminal (or end) of the second inductor 235. The second inductor 235 may be connected in series with the MST module 280. A capacitor may also be disposed in the pulse shaper filter 271. A capacitance of the capacitor included in the pulse shaper filter 271 (or a capacitance of the filter 113) may be 50 times greater than a capacitance of the first capacitor C1.

In the above-described structure, when the state switch MSW is turned-on in response to a mode signal MS, the capacitor of the pulse shaper filter 271 has a significantly greater capacitance in comparison to the first capacitor C1 when viewing the second inductor 235 from the outside, thus the structure may be equivalent to when only the MST module 280 is connected to the second inductor 235 without being affected by the first capacitor C1. In addition, when the state switch MSW is turned-off, the pulse shaper filter 271 may become a floating state relative to the second inductor 235. In the floating state, the capacitor included in the pulse shaper filter 271 may correspond to the substantially removed state. As a result, an AC signal received through the second inductor 235 may be delivered to the switching circuit 210 through the first capacitor C1.

The first switching element SW1 and the third switching element SW3 may be coupled to the LDO 175 through the power supply node PN. The LDO 175 may process power changed to a DC form through the switching circuit 210 to enable the power to charge the battery 180, and then deliver the processed power to the PMIC 170.

The control circuit 250 (or application processor 120) may change a polarity of the second inductor 235 between a first polarity and a second polarity that is opposite the first polarity by driving the switching circuit 210. For example, the control circuit 250 (or application processor 120) may generate switching control signals SCS1~SCS4 to turn the first and fourth switches SW1 and SW4 on and the second and third switches SW2 and SW3 off, which changes the second inductor 235 to a first polarity by forming a current path from the power supply node PN to the ground node G through the first switching element SW1, the second inductor 236 and the fourth switching element SW4. Also, the control circuit 250 (or application processor 120) may generate switching control signals SCS1~SCS4 to turn the first and fourth switches SW1 and SW4 off and the second and third switches SW2 and SW3 on, which changes the second inductor 235 to a second polarity by forming a current path from the power supply node PN to the ground node G (coupled to the ground voltage GND) through the second switching element SW2, the second inductor 235, and the third switching element SW3.

Figure 13:
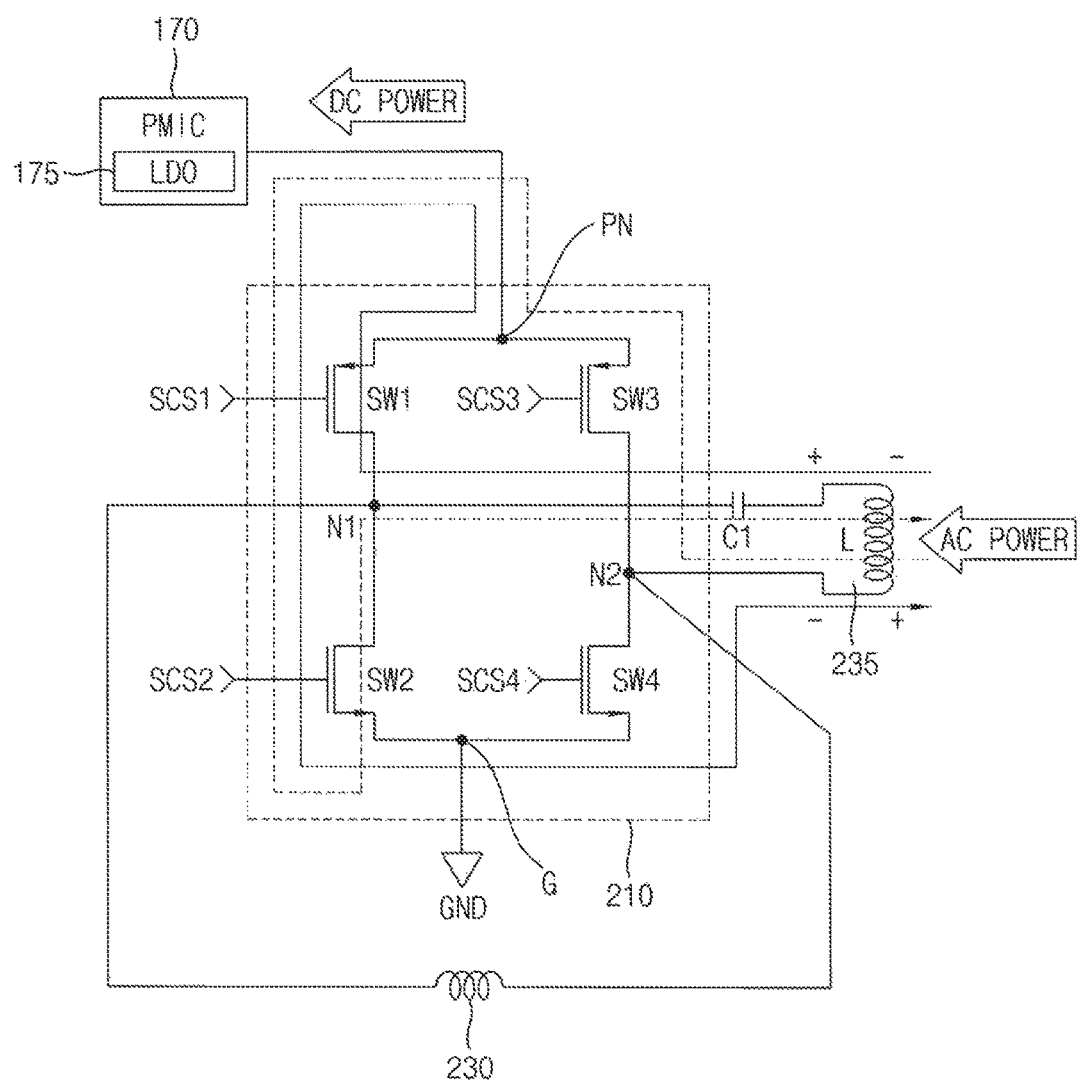
FIG. 13 is a diagram explaining a wireless power reception state in the MST device of FIG. 12 according to some example embodiments.

FIG. 13 is a diagram explaining a wireless power reception state in the MST device of FIG. 12 according to some example embodiments.

Referring to FIG. 13, when wireless power is received from the outside in the wireless power charging state, in the MST device 200c, a cathode of an AC signal may be formed at the first terminal of the second inductor 235 and an anode of the AC signal may be formed at the second terminal of the second inductor 235. When it is sensed through a sensor separately provided on the second inductor 235 that there is a flow of a signal having a value equal to or greater than a certain size, the control circuit 250 (or application processor 120) may enable the first switching element SW1 and the fourth switching element SW4 to have a turn-on state and the second switching element SW2 and the third switching element SW3 to have a turn-off state.

Thus, a signal formed in the second inductor 235 may flow toward the source of the first switching element SW1 along a signal line on which the first capacitor C1 is disposed, and may be supplied to the LDO 175 through the first switching element SW1 in the turn-on state. The LDO 175 may deliver the supplied signal to the PMIC 170 through DC-DC conversion. A corresponding signal is returned to the second inductor 235 through the fourth switching element SW4 grounded in common with the LDO 175, so the ½ cycle of the AC signal through the first switching element SW1 and the fourth switching element SW4 may be completed.

Since wireless power received from the outside is changed in characteristic according to an AC signal characteristic during the remaining ½ cycle, the anode of the AC signal may be formed at the first terminal of the second inductor 235 and the cathode of the AC signal may be formed at the second terminal of the second inductor 235. The control circuit 250 (or application processor 120) may enable the first switching element SW and the fourth switching element SW4 to have a turn-off state, and the second switching element SW2 and the third switching element SW3 to have a turn-on state, which sets the polarity of the second inductor 250 to the second polarity. Thus, the signal formed in the second inductor 235 may be delivered to the LDO 175 through the third switching element SW3 in the turn-on state and may be returned through a signal line on which the first capacitor C1 is disposed, via the second switching element SW2 connected to a common ground. In the above-described operation, switching elements included in the switching circuit 210 may rectify the AC signal to convert the rectified signal into a DC signal and deliver the converted signal to the LDO 175.

Figure 14:
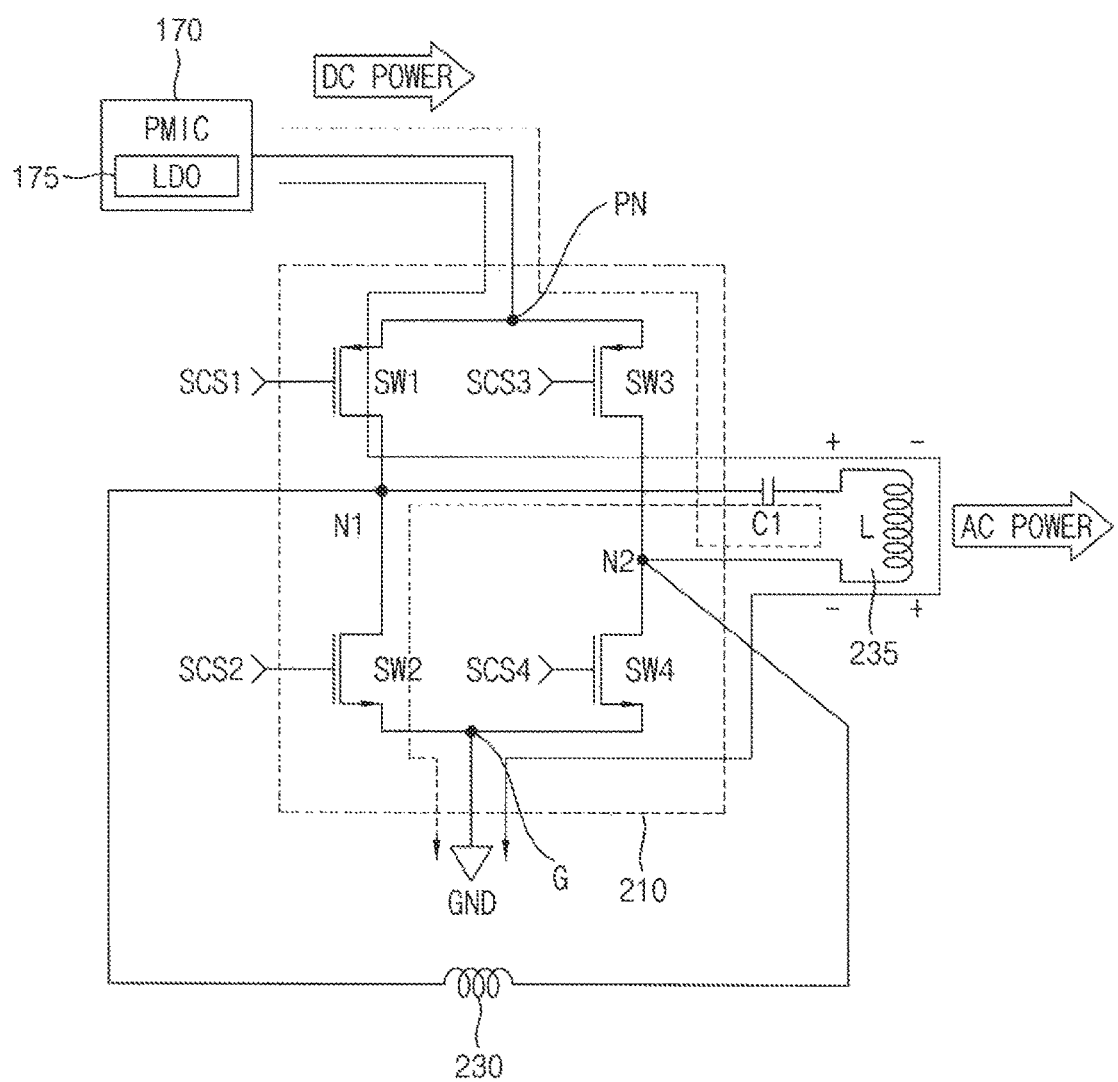
FIG. 14 is a diagram explaining a wireless power transmission state in the MST device of FIG. 12 according to some example embodiments.

FIG. 14 is a diagram explaining a wireless power transmission state in the MST device of FIG. 12 according to some example embodiments.

Referring to FIG. 14, in a wireless power transmission state, the MST device 200 may receive, through the LDO 175, a signal supplied from PMIC 170, and deliver the received signal to the switching circuit 210 to enable the signal to flow toward the inductor 210.

Regarding this, the control circuit 250 (or application processor 120) may enable the first switching element SW1 and the fourth switching element SW4 to have a turn-on state, and the second switching element SW2 and the third switching element SW3 to have a turn-off state, which sets the second inductor 235 to the first polarity. Thus, a path may be formed which includes the first switching element SW1 in the turn on state, a signal line including the first capacitor C1, the second inductor 235, the fourth switching element SW4, and the ground node G (coupled to the ground voltage GND).

A DC signal output through the LDO 175 may be converted into an AC signal via the switching elements of the switching circuit 210 and then flow into the second inductor 235.

When the ½ cycle of the AC signal elapses, the control circuit 250 may enable the first switching element SW1 and the fourth switching element SW4 to have a turn-off state, and the second switching element SW2 and the third switching element SW3 to have a turn-on state. Thus, the DC signal output through the LDO 175 may be supplied along a path that includes the third switching element SW3 in the turn-on state, the source of the fourth switching element SW4, the second inductor 235, a signal line on which the first capacitor C1 is disposed, the source of the first switching element SW1, the second switching element SW2, and the ground node G (coupled to the ground voltage GND), to supply the AC signal to the second inductor 235.

Figure 15:
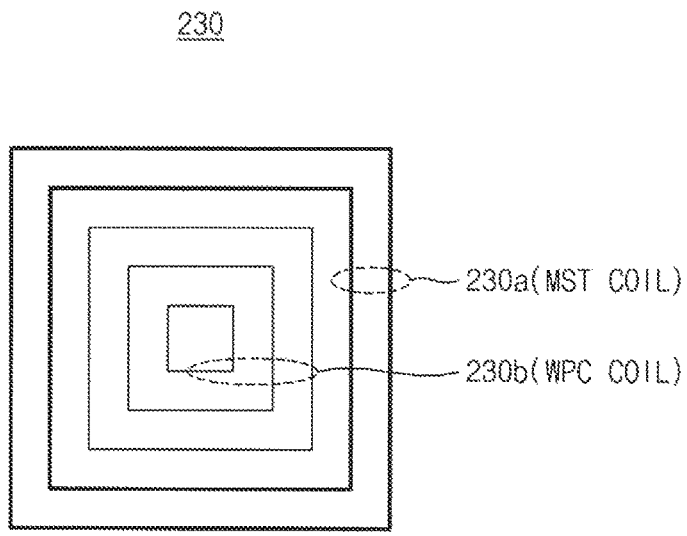
FIG. 15 is illustrates an example of the inductor in the MST device of FIG. 12 according to some example embodiments.

FIG. 15 is illustrates an example of the inductor in the MST device of FIG. 12 according to some example embodiments.

Referring to FIG. 15, the inductor 230 may include a first coil 230a and a second coil 230b, and the first coil 230a and the second coil 230b may be disposed as in FIG. 15.

For example, the first coil 230 may be provided in such a manner that at least one closed curve is disposed at a distance equal to or greater than a certain value from the center. The second coil 230b may be disposed at the center of the first coil 230a in such a manner that at least one closed curve is disposed at a distance equal to or less than a certain value from the center. Although in FIG. 15, the first coil 230a and the second coil 230b are disposed in such a manner that two closed curves have a certain interval, various embodiments are not limited thereto. The number of the closed curves may vary according to a mounting region.

Figure 16:
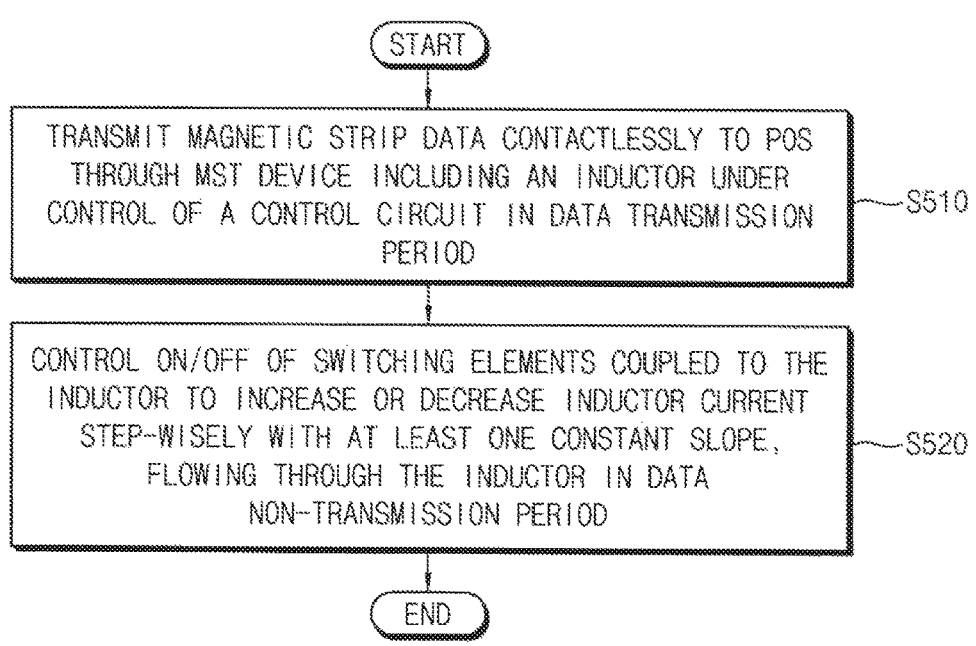
FIG. 16 is a flow chart illustrating a method of operating an MST device according to some example embodiments.

FIG. 16 is a flow chart illustrating a method of operating an MST device according to some example embodiments.

Referring to FIGS. 1 through 11 and 16, in a method of operating an MST device 200, the magnetic pulse 270 including the magnetic stripe data is wirelessly transmitted to the POS terminal 400 through the MST device 200 including the inductor 230 in a data transmission period according to control of the control circuit 120 or 250 (S510).

In a data non-transmission period after the data transmission period, the control circuit 250 controls on/off the switching elements SW1~SW4 in the switching circuit 210 such that the inductor current IL increases or decreases step-wisely with at least one constant slope (S520). In some example embodiments, for decreasing the inductor current step-wisely with at least one constant slope, the control circuit 250 controls on/off the switching elements SW1~SW4 such that a substantial maintenance and a linear decrease of the inductor current IL may be alternatingly repeated. In some example embodiments, for increasing the inductor current step-wisely with at least one constant slope, the control circuit 250 controls on/off the switching elements SW1~SW4 such that a substantial maintenance and a linear increase of the inductor current IL may be alternatingly repeated.

Figure 17:
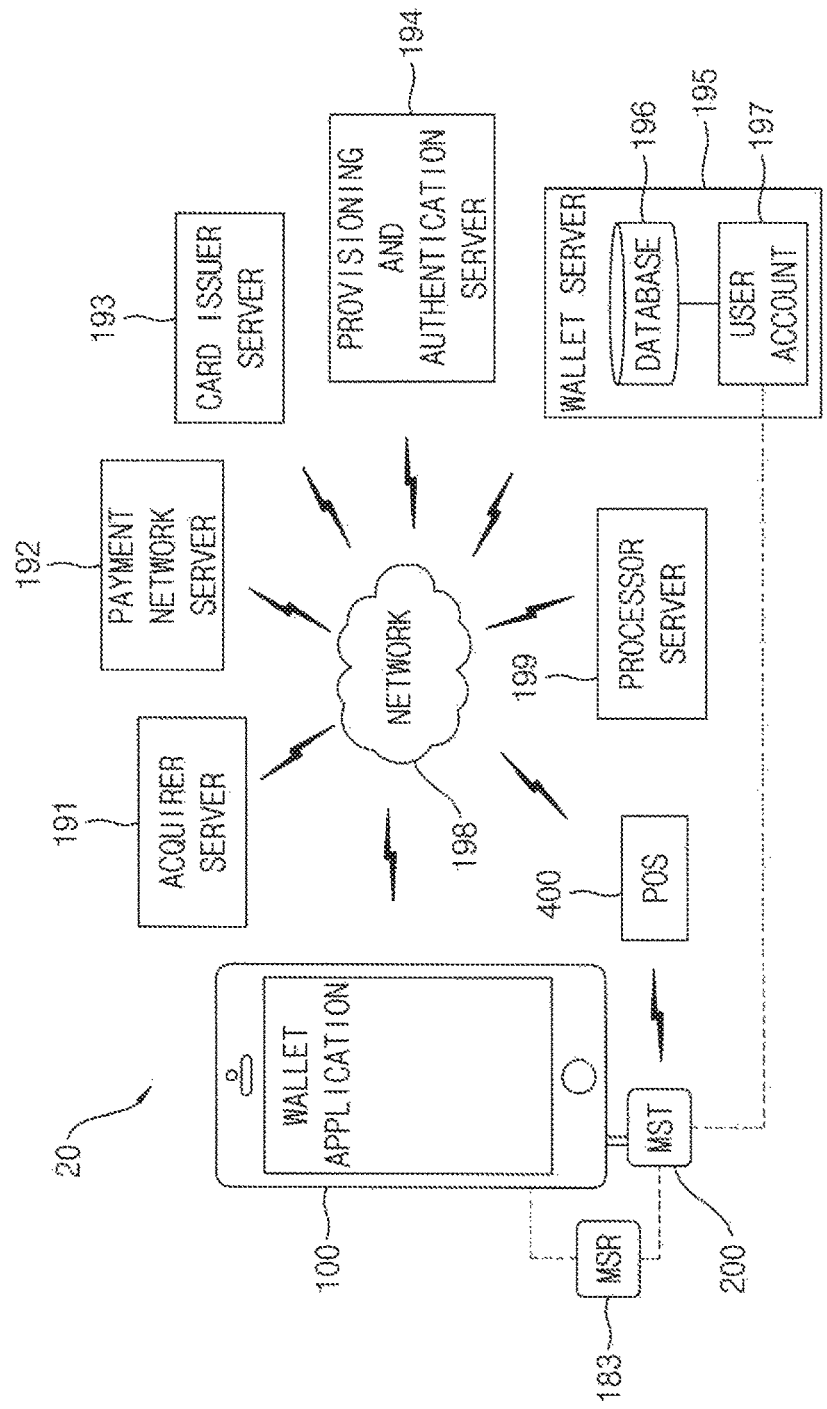
FIG. 17 is a block diagram illustrating a system including an MST device according to some example embodiments.

FIG. 17 is a block diagram illustrating a system including an MST device according to some example embodiments.

Referring to FIG. 17, a system 20 includes an MST device 200, a mobile device 100, a wallet server 195, a provisioning and authentication server 194, a card issuer server 193, an acquirer server 191, a point of sale (POS) 400, a payment network server 192, a processor server 199 (e.g., a third party processor server of the issuer), and an encrypted magnetic stripe reader 183 (MSR) which can be part of the MST device 200 (as illustrated in FIG. 17) or work alone with a wallet application on the mobile communication device 100. The MST device 200 in FIG. 17 may be substituted with any one of the MST device 200', 200", and 200b described above.

The MST device 200 interfaces with the mobile device 100 or may be embedded in the mobile device 100, and the mobile device 100 communicates with the wallet server 195, the provisioning and authentication server 194, the card issuer server 193, and the acquirer server 191 via a network 198. Each of the wallet server 195, the provisioning and authentication server 194, the card issuer server 193, the acquirer server 191, the payment network server 192, and the processor server 199, may also communicate with one another via the network 198.

In some example embodiments, the wallet server 195 may include one or more databases 196 and user accounts 197. The one or more databases 196 may store association data of the MST device 200 and the user accounts 197, and one or more keys used by the MST device 200 and/or the wallet server 195. The MST device 200 may be registered with a user account 197, as described in further detail below.

It should also be appreciated that the provisioning and authentication server 194, the card issuer server 193, and the acquirer server 191 may also include one or more databases and other components, such as, software and/or hardware to allow for the methods disclosed herein to be performed.

As described above, in some example embodiments, the MST devices 200, 200', and 200" may be a dongle that may be connected to and disconnected from the mobile device 100. The MST devices 200, 200', and 200" may communicate with the mobile device 100 through an audio port and/or through other types of communication interfaces, for example including, but not limited to, a USB port, a 30 pin or 9 pin Apple interface, a Bluetooth interface, a near field communication (NFC), and other serial interfaces. While the MST devices 200, 200', and 200" are illustrated as a dongle, the MST devices 200, 200', and 200" may be another type of peripheral device that communicates with the mobile device 100 through a contactless interface, such as Bluetooth or NFC; or the MST devices 200, 200', and 200" may be embedded inside of the mobile device 100 as part of mobile device 100.

In some example embodiments, a user may set up the user account 197 on the wallet server 195, for example, by downloading and/or installing a wallet application on the mobile device 100. The wallet application may be an interface for a user to view a list of cards available for Card-Not-Present (CNP) and Card-Present (CP) transactions. In some example embodiments, the user may choose or select a card and transmit card data corresponding to the card (for example, card track data) using the MST device 200, in either a static or a dynamic-CVV (dCVV) mode. Similarly, when performing CNP transactions, the user may view a dynamically computed Expiry Date (EXP) and CVV-2 and use them to fill checkout web forms to perform a dCVV CNP transaction.

The user may also set up the user account 197 using a computer connected to the network 198 by accessing a user account web portal. To set up the user account 197, the user may specify a username, password and a personal PIN. The password may be used to login to the wallet application on the mobile device 100. Once the user is logged in, the personal PIN may be used to enter a payment card section of the wallet application, as well as to unlock the wallet application.

Figure 18:
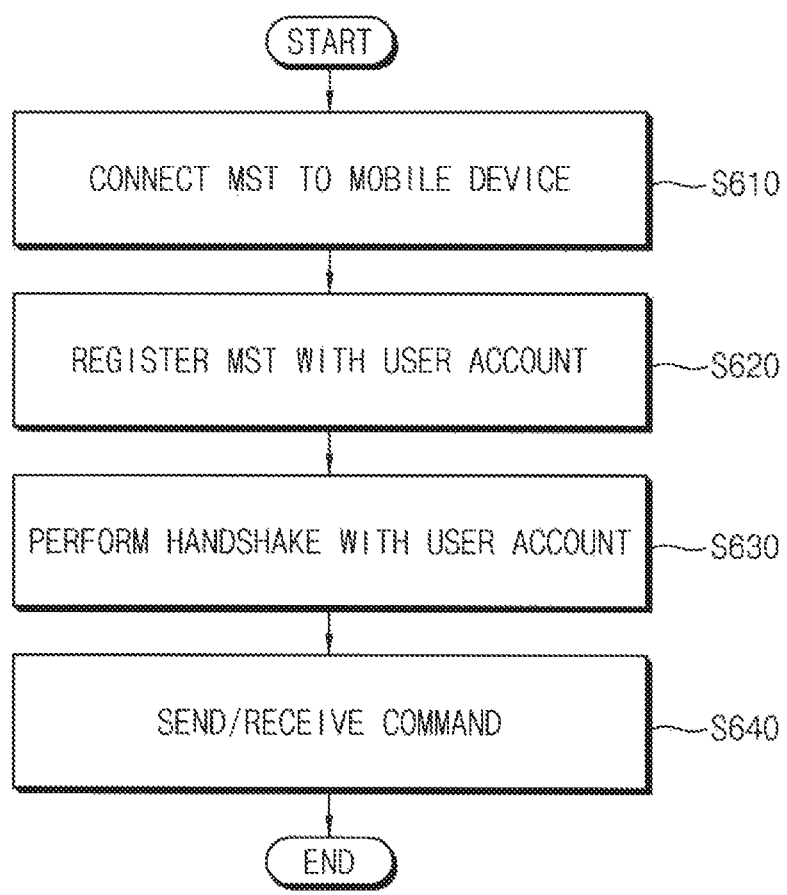
FIG. 18 is a flow chart illustrating a method of initializing the MST device in the system of FIG. 17 according to some example embodiments.

FIG. 18 is a flow chart illustrating a method of initializing the MST device in the system of FIG. 17 according to some example embodiments. The method of FIGS. 17-18 may be applied to any one of the MST devices 200, 200', 200", 200b, and 200c above.

Referring to FIGS. 17 and 18, in method of initializing the MST device 200, having a unique device ID, to a user account 197, an MST device 200 is initialized or registered for the first time to a user account by plugging in or connecting the MST device 200 to the mobile device 100 (S610).

Upon connecting the MST device 200 to the mobile device 100, the wallet application recognizes the MST device 200 and registers the MST device 200 with the user account 197 of the user (S620). When the MST device 200 has been registered and connected to the appropriate user account, the MST device 200 and the user account 197 may perform a handshake (S630), and send and receive commands (S640).

Once the MST device 200 has been registered with the user account 197, the user can use the wallet application to load his/her cards by swiping the cards on a built in MSR of the MST device 200 or a separate MSR 183 that may be connected to the MST device 200 or the mobile device 100. The card data may be digitized and encrypted, and stored in the MST device 200 for later use. For example, as illustrated in FIG. 17, the cards may be used by the MST device 200 and sent to the POS 400 to effect a transaction.

Figure 19:
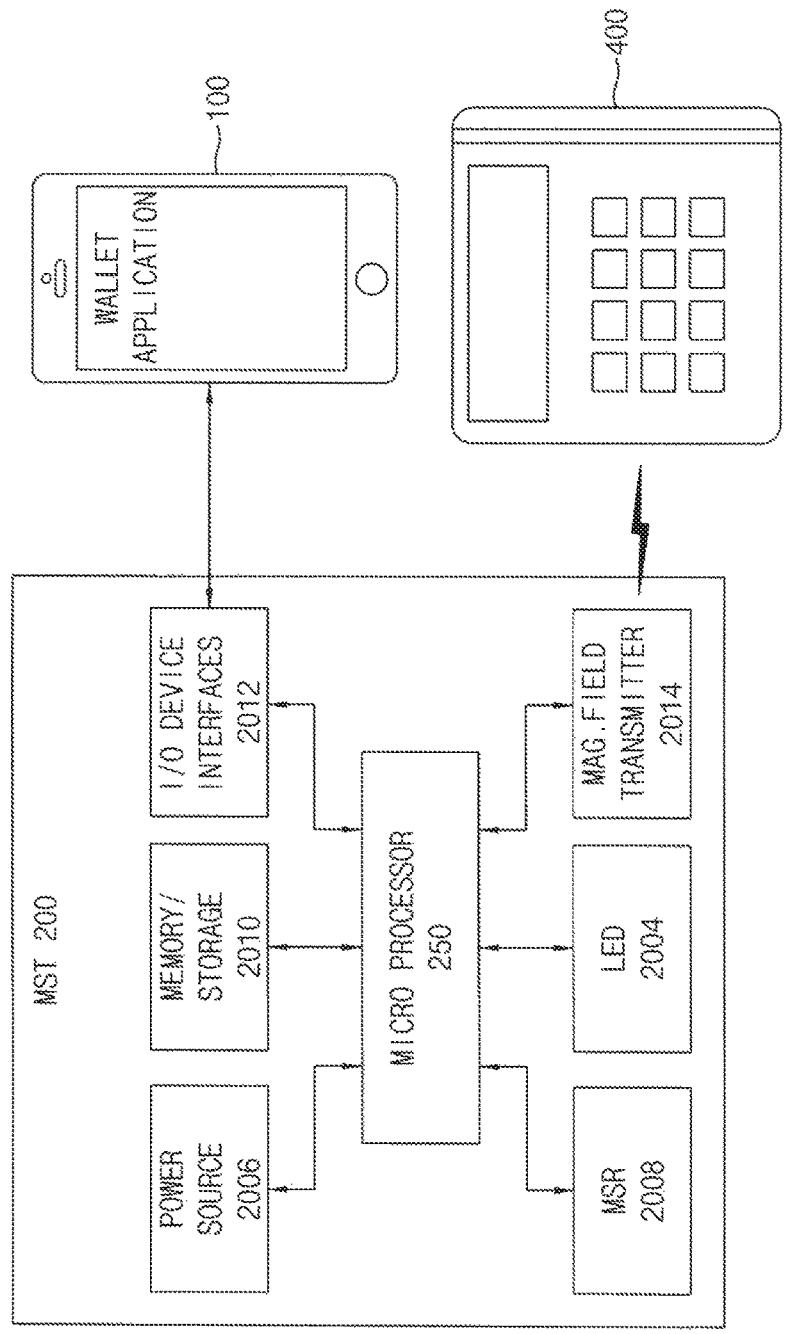
FIG. 19 is a functional diagram illustrating the MST device in FIG. 17 according to some example embodiments.

FIG. 19 is a functional diagram illustrating the MST device in FIG. 17 according to some example embodiments.

Referring to FIG. 19, the MST device 200 may include a microprocessor 250, a light-emitting diode (LED) indicator 2004, a power source 2006, optionally a magnetic stripe reader (MSR) 2008, a memory storage component or secure element 2010, an input/output interface 2012 (for example, a 3.5 mm or other standard audio port, a USB port/jack interface or other communication interface, including but not limited to a 30 pin or 9 pin Apple interface, a Bluetooth interface, and other serial interfaces), and a magnetic field transmitter 2014 which includes a switching circuit and an inductor for transmitting magnetic pulses to be received by any POS device with a MSR, such as the POS terminal 400.

The microprocessor 250 handles security and communications with the mobile device 100. The microprocessor 205 can also transmit and receive encrypted card data to and from the secure element 2010. Various encryption methods may be used. For example, binary data may be encrypted and decrypted using an authentication key in combination with a XOR operation. However, example embodiments are not limited thereto. The magnetic field transmitter 2014 transmits magnetic stripe data of a cardholder to the POS terminal 400 by transmitting magnetic impulses to the MSR of the POS terminal 400. The magnetic field transmitter 2014 may include the switching circuit 210 and the inductor 230 in FIGS. 1A, 1B, and 1C.

The MST device 200 may also be used for reading other magnetic stripe cards by using the optional MSR 2008. The MSR 2008 may be used for loading payment card data onto the secure element 2010 and for capturing card track data.

As described above, the MST device 200 has the ability to load any type of magnetic stripe card into the memory means, not just payment cards. Non-payment cards may be stored separately with less security for convenience. For example, some non-payment applications may include cards to open doors, loyalty cards, etc. The loading of payment data vs. non-payment data may be separated into two separate fields or storage areas. In an example, payment cards may not be loaded into non-payment storage. For example, payment data may have a specific format that can be detected and may not be allowed to be loaded into the non-payment storage area. The payment cards may also require authentication with the application before being transmitted. On the other hand, default non-payment data may be transmitted without authentication.

The MST device 200 is capable of connecting to mobile device 100 via different interfaces beyond audio jack and USB connections (such as Bluetooth, and other wireless communication interfaces). The devices, systems, and methods allow for the loading of encrypted card data into the memory means of the MST device 200 that can later be decrypted and transmitted to the POS terminal 400, or can be transmitted encrypted to the mobile device 100 and then routed to the payment server for decryption and processing for loading a user account on the server or processing a POS transaction.

Figure 20:
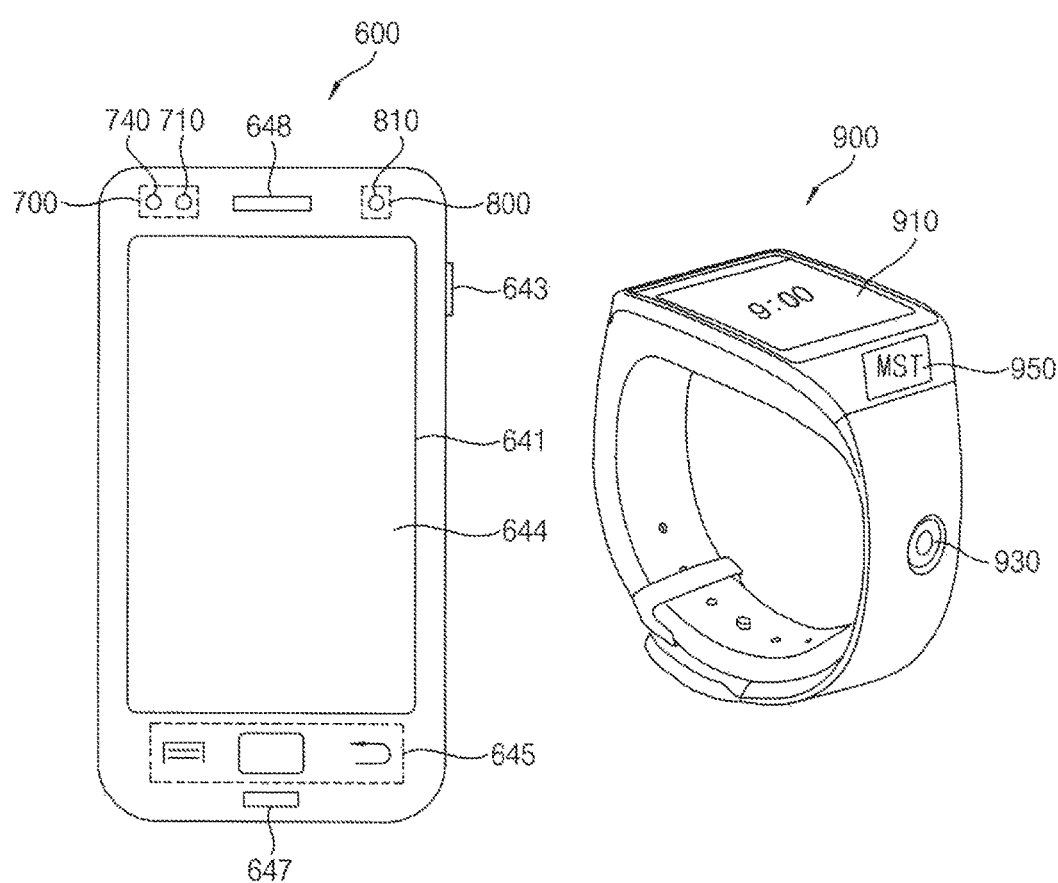
FIG. 20 is a block diagram illustrating a mobile system according to some example embodiments.

FIG. 20 is a block diagram illustrating a mobile system according to some example embodiments.

Referring to FIG. 20, a mobile system 30 may include a mobile device 600 and a wearable device 900. The mobile device 600 may be a smart phone, and the wearable device 900 may be a watch-type wearable device that operates in cooperation with the mobile device 600.

The wearable device 900 may operate in cooperation with the mobile device 600, and may display in the display panel 910 messages or phone calls received by the mobile device 600. In addition, the wearable device 900 may transmit to the mobile device 600 images captured by the camera module 930. In addition, the wearable device 900 may run various applications independently from the mobile device 600.

The mobile device 600 may include a three-dimensional (3D) image sensor 700, a two-dimensional (2D) image sensor 800 and a display device 641. The mobile device 600 may further include a touch screen 644, buttons 643 and 645, a microphone 647, and a speaker 648.

The 3D image sensor 700 may be installed on a first surface (e.g., a front surface) of the mobile device 600. The 3D image sensor 700 may perform a first sensing to detect a proximity of a subject, and a second sensing to recognize a gesture of the subject by acquiring distance information for the subject. The 3D image sensor 700 may include a sensing unit 710 having a plurality of depth pixels and a light source unit 740 to emit infrared ray or near-infrared ray.

The 2D image sensor 800 may be installed on the first surface of the mobile device 600 and may perform a third sensing to acquire color image information for the subject. The 2D image sensor 800 may include a second sensing unit 810 having a plurality of color pixels.

In FIG. 20, the 3D image sensor 700 and the 2D image sensor 800 may be prepared as two integrated circuit chips separated from each other. In other words, the mobile device 600 may include two sensing modules. In this case, the depth pixels and the color pixels may constitute two pixel arrays separated from each other.

The mobile device 600 may employ the mobile device 100 in FIGS. 1A to 1C.

The wearable device 900 may include an MST device 950. The MST device 950 may employ any one of the MST devices 200, 200', 200", 200b, and 200c in FIGS. 1A to 1C, 11-12, and 19. The MST device 950 may be a dongle that may be connected to and disconnected from the wearable device 900 or may be embedded within the wearable device 900.

The wallet application 105 in FIGS. 1A to 1C may be loaded in the mobile device 600 or the wearable device 900, the wearable device 900 is held close to the POS terminal 400, and the payment icon/key is pressed on the wearable device 900. Then, the magnetic impulses (or magnetic pulses) including the magnetic stripe data associated with the selected card from the inductor of the MST device 950 are picked-up by the magnetic stripe reader head in the POS terminal, are converted into electrical pulses, and transaction is performed.

The MST device 950, as described with reference to FIGS. 1A through 11, may reduce power consumption in data non-transmission period by controlling an inductor current in the data non-transmission period such that the inductor current increases or decreases step-wisely with at least one constant slope. Therefore, the MST device 950 may be embedded within or may cooperate with the wearable device which has limited power supply. In addition, the MST device 950, as described with reference to FIGS. 12 through 15, may charge wireless power in a rechargeable battery or may transmit wireless power to the outside.

Various example embodiments may be applied to various mobile devices and wearable devices to reduce power consumption.

The foregoing is illustrative of some example embodiments and is not to be construed as limiting thereof. Although a few example embodiments have been described, those skilled in the art will readily appreciate that many modifications are possible in example embodiments without materially departing from the novel teachings and features of inventive concepts. Accordingly, all such modifications are intended to be included within the scope of the present disclosure as defined in the claims.

What is claimed is:

1. A magnetic secure transmission (MST) system, comprising:
    an inductor;
    a switching circuit connected to the inductor; and
    a control circuit,
    the control circuit being configured to control the switching circuit to adjust a level of a current in the inductor by a first amount over a data transmission period, such that the inductor emits a magnetic pulse including a first magnitude during the data transmission period,
    the control circuit being configured to control the switching circuit to adjust the level of the current in the inductor such that the level of the current in the inductor is maintained at a first constant level during a first sub-period of a data non-transmission period, the level of the current in the inductor changes a second amount at a constant slope during a second sub-period of the data non-transmission period, the level of the current in the inductor is maintained at a second constant level during a third sub-period of the data non-transmission period, and the inductor emits a magnetic pulse including a second magnitude during the second sub-period of the data non-transmission period,
    the second sub-period of the data non-transmission period being after the first sub-period of the data non-transmission period and before the third sub-period of the data non-transmission period in a same one of the data non-transmission period,
    the second amount being less than the first amount,
    the second constant level being greater than or less than the first constant level,
    the first magnitude being greater than a threshold value corresponding to a noise level, and
    the second magnitude being less than the threshold value.

2. The MST system of claim 1, wherein
    the control circuit is configured to adjust a time interval of the data non-transmission period between a first value and a second value, and
    the first value is different than the second value.

3. The MST system of claim 1, wherein
    the control circuit is configured to control the switching circuit to adjust the level of the current by a first slope during the data transmission period,
    the control circuit is configured to control the switching circuit to adjust the level of the current by a second slope during the second sub-period of the data non-transmission period, and
    a magnitude of the first slope is different than a magnitude of the second slope.

4. The MST system of claim 1, wherein
    the control circuit is configured to control the switching circuit to decrease the current of the inductor from a first level to a second level in a first stepwise pattern during a first mode of the data non-transmission period,
    the control circuit is configured to control the switching circuit to decrease the current of the inductor from a third level to the second level in a second stepwise pattern during a second mode of the data non-transmission period,
    the first and second modes of the data non-transmission period are different from each other,
    a direction of the current of the inductor at the first level is opposite a direction of the current of the inductor at the third level, and
    the second level is between the first level and the third level.

5. The MST system of claim 4, wherein
    the control circuit is configured to control the switching circuit to increase the current of the inductor from the second level to the first level in a third stepwise pattern during the first mode of the data non-transmission period, and
    the control circuit is configured to control the switching circuit to increase the current of the inductor from the second level to the third level in a fourth stepwise pattern during the second mode of the data non-transmission period.

6. The MST system of claim 5, wherein
    the control circuit, during the first mode of the data non-transmission period, is configured to control the switching circuit to increase the current of the inductor in the third stepwise pattern after decreasing the current of the inductor in the first stepwise pattern, and the control circuit, during the second mode of the data non-transmission period, is configured to control the switching circuit to increase the current of the inductor in the fourth stepwise pattern after decreasing the current of the inductor in the second stepwise pattern.

7. The MST system of claim 5, wherein
the control circuit, during the first mode of the data non-transmission period, is configured to control the switching circuit to maintain the current of the inductor at the second level during a first time interval in between decreasing the current of the inductor in the first stepwise pattern and increasing the current of the inductor in the third stepwise pattern.

8. The MST system of claim 5, wherein
the control circuit, during the second mode of the data non-transmission period, is configured to control the switching circuit to maintain the current of the inductor at the second level during a first time interval in between decreasing the current of the inductor in the second stepwise pattern and increasing the current of the inductor in the fourth stepwise pattern.

9. The MST system of claim 1, wherein
the switching circuit includes,
a first switching element connected between a power node and a first node,
a second switching element connected between the first node and a ground node,
a third switching element connected between the power node and a second node, and
a fourth switching element connected between second node and the ground node,
the first node is connected to a first end of the inductor, and
the second node is connected to a second end of the inductor.

10. The MST system of claim 9, wherein
the first and second switching elements are serially connected to each other between the power node and the ground node, and
the third and fourth switching elements are serially connected to each other between the power node and the ground node.

11. The MST system of claim 9, wherein
the first and third switching elements are NMOS transistors, and
the second and fourth switching elements are PMOS transistors.

12. The MST system of claim 9, wherein
the first and third switching elements are NMOS transistors, and
the second and fourth switching elements are NMOS transistors.

13. The MST system of claim 9, wherein
the first and third switching elements are PMOS transistors, and
the second and fourth switching elements are PMOS transistors.

14. The MST system of claim 1, further comprising:
a MST device, wherein
the MST device includes the switching circuit and at least one of the control circuit and the inductor.

15. The MST system of claim 1, further comprising:
a power management integrated circuit (PMIC) connected to the switching circuit;
a battery connected to the PMIC;
a second inductor connected to the switching circuit; and
a capacitor connected to the switching circuit and a first end of the second inductor, wherein
the inductor for emitting the magnetic pulse is a first inductor,
the control circuit is configured to control the switching circuit to change a polarity of the second inductor between a first polarity and a second polarity,
the first polarity is opposite the second polarity,
the control circuit is configured to operate the second inductor in a power reception state based on setting the second inductor to the second polarity using the switching circuit, and
the control circuit is configured to operate the second inductor in a power transmission state based on setting the second inductor to the first polarity using the switching circuit.

16. A payment system, comprising:
the MST system of claim 1;
a MST device in the MST system, the MST device including the switching circuit; and
a mobile device coupled to the MST device, wherein
the mobile device includes a wallet application configured to send magnetic strip data to the control circuit,
the control circuit is configured to control the switching circuit to adjust the level of the current in the inductor, based on the magnetic strip data, to emit a plurality of magnetic pulses including the first magnitude during a plurality of data transmission periods, respectively,
the plurality of magnetic pulses including the first magnitude include the magnetic pulse including the first magnitude, and
the plurality of data transmission periods include the data transmission period.

17. A magnetic secure transmission (MST) device, comprising:
a switching circuit including a first port and a second port that are configured to connect to a first end and a second end, respectively, of an inductor external to the MST; and
a control circuit coupled to the switching circuit,
the control circuit being configured control the switching circuit to adjust a level of a current in the inductor if the first end and the second end of the inductor are connected to the first port and the second port of the switching circuit,
the control circuit being configured to control the switching circuit
to adjust the level of the current in the inductor by a first amount such that the inductor emits a magnetic pulse including a first magnitude during a data transmission period,
the control circuit being configured to control the switching circuit to adjust the level of the current in the inductor such that the level of the current in the inductor is maintained at a first constant level during a first sub-period of a data non-transmission period, the level of the current in the inductor changes a second amount at a constant slope during a second sub-period of the data non-transmission period, the level of the current in the inductor is maintained at a second constant level during a third sub-period of the data non-transmission period, and the inductor emits a magnetic pulse including a second magnitude during the second sub-period of the data non-transmission period, the second sub-period of the data non-transmission period being after the first sub-period of the data non-transmission period and before the third sub-period of the data non-transmission period in a same one of the data non-transmission period, the second amount being less than the first amount, the second constant level being greater than or less than the first constant level, the first magnitude being greater than a threshold value corresponding to a noise level, and the second magnitude being less than the threshold value.

18. The MST device of claim 17, wherein
the switching circuit includes,
- a first switching element connected between a power node and a first node,
- a second switching element connected between the first node and a ground node,
- a third switching element connected between the power node and a second node, and
- a fourth switching element connected between second node and the ground node, the first node is connected to the first port, and
the second node is connected to the second port.

19. A magnetic secure transmission (MST) device, comprising:
- an inductor;
- a switching circuit connected to the inductor; and
- a control circuit coupled to the switching circuit,
  - the control circuit being configured to control the switching circuit to adjust a level of a current in the inductor by a first amount such that the inductor emits a magnetic pulse including a first magnitude during a data transmission period,
  - the control circuit being configured to control the switching circuit to adjust the level of the current in the inductor such that the level of the current in the inductor is maintained at a first constant level during a first sub-period of a data non-transmission period, the level of the current in the inductor changes a second amount at a constant slope during a second sub-period of the data non-transmission period, the level of the current in the inductor is maintained at a second constant level during a third sub-period of the data non-transmission period, and the inductor emits a magnetic pulse including a second magnitude during the second sub-period of the data non-transmission period, the second sub-period of the data non-transmission period being after the first sub-period of the data non-transmission period and before the third sub-period of the data non-transmission period in a same one of the data non-transmission period, the second amount is less than the first amount, the second constant level being greater than or less than the first constant level, the first magnitude is greater than a threshold value corresponding to a noise level, and the second magnitude is less than the threshold value.

20. The MST device of claim 19, wherein
the switching circuit includes,
- a first switching element connected between a power node and a first node,
- a second switching element connected between the first node and a ground node,
- a third switching element connected between the power node and a second node, and
- a fourth switching element connected between second node and the ground node, the first node is connected to a first end of the inductor, and
the second node is connected to a second end of the inductor.

* * * * *